United States Patent
Rocholl et al.

(10) Patent No.: US 11,414,267 B2
(45) Date of Patent: Aug. 16, 2022

(54) REAR LIFT ASSEMBLY FOR REFUSE VEHICLE

(71) Applicant: Oshkosh Corporation, Oshkosh, WI (US)

(72) Inventors: Joshua D. Rocholl, Rochester, MN (US); Derek A. Wente, Austin, MN (US); John T. Kellander, Oronoco, MN (US); Cody D. Clifton, Mapleton, MN (US); Vincent Hoover, Byron, MN (US); Zachary L. Klein, Rochester, MN (US); Clinton T. Weckwerth, Pine Island, MN (US); Skylar A. Wachter, Dodge Center, MN (US); Andrew Kotloski, Oshkosh, WI (US); Wallace Buege, West Bend, WI (US); Caleb Binder, Oshkosh, WI (US); Martin J. Schimke, Red Granite, WI (US)

(73) Assignee: Oshkosh Corporation, Oshkosh, WI (US)

( * ) Notice: Subject to any disclaimer, the term of this patent is extended or adjusted under 35 U.S.C. 154(b) by 26 days.

(21) Appl. No.: 16/851,309

(22) Filed: Apr. 17, 2020

(65) Prior Publication Data
US 2020/0346855 A1 Nov. 5, 2020

Related U.S. Application Data

(60) Provisional application No. 62/842,919, filed on May 3, 2019.

(51) Int. Cl.
*B65F 3/04* (2006.01)
*F16H 21/40* (2006.01)
*B65F 3/02* (2006.01)

(52) U.S. Cl.
CPC ........ *B65F 3/041* (2013.01); *B65F 2003/023* (2013.01); *B65F 2003/0256* (2013.01); *B65F 2003/0279* (2013.01); *F16H 21/40* (2013.01)

(58) Field of Classification Search
CPC .... B65F 3/041; B65F 3/046; B65F 2003/023; B65F 2003/0246; B65F 2003/0256; F16H 21/40
(Continued)

(56) References Cited

U.S. PATENT DOCUMENTS 3,732,997 A * 5/1973 Reavis .................... B65F 3/043
414/406
4,042,137 A * 8/1977 Hughes ................... B65F 1/122
414/406
(Continued)

FOREIGN PATENT DOCUMENTS

DE            3811460 A1 * 10/1988  .............. B65F 3/046
DE     102008013940 A1 *  9/2009  ................ B65F 3/08
(Continued)

OTHER PUBLICATIONS

Cart Tippers, McNeilus Refuse—Catalog, URL: https://www.streetsmartparts.com/refuse/cart-tippers-c510.html, Retrieved Sep. 9, 2020, 1 page.

*Primary Examiner* — James Keenan
(74) *Attorney, Agent, or Firm* — Foley & Lardner LLP

(57) ABSTRACT

A tipper assembly includes a base configured to couple to a tailgate of the refuse vehicle, an actuator powered by electric energy, an arm extending from and pivotally coupled to at least one of the actuator or the base, and an implement coupled to the arm. The implement is configured to engage with a refuse container such that operation of the actuator facilitates pivoting the implement and the refuse container (Continued)

from a base position to a dump position to dump contents within the refuse container into an opening in the tailgate.

17 Claims, 19 Drawing Sheets

(58) Field of Classification Search
USPC .......................................... 414/406, 408, 421
See application file for complete search history.

(56) References Cited

U.S. PATENT DOCUMENTS

| | | | |
|---|---|---|---|
| 4,741,658 A * | 5/1988 | Zelinka | B65F 3/046 |
| | | | 414/406 |
| 5,026,241 A * | 6/1991 | Wyman | B65F 3/046 |
| | | | 414/303 |
| 5,919,027 A | 7/1999 | Christenson | |
| 5,934,858 A | 8/1999 | Christenson | |
| 5,934,867 A | 8/1999 | Christenson | |
| 5,938,394 A | 8/1999 | Christenson | |
| 5,951,235 A | 9/1999 | Young et al. | |
| 5,967,731 A | 10/1999 | Brandt | |
| 5,971,694 A | 10/1999 | McNeilus et al. | |
| 5,984,609 A | 11/1999 | Bartlett | |
| 6,033,176 A | 3/2000 | Bartlett | |
| 6,062,803 A | 5/2000 | Christenson | |
| 6,089,813 A | 7/2000 | McNeilus et al. | |
| 6,120,235 A | 9/2000 | Humphries et al. | |
| 6,123,500 A | 9/2000 | McNeilus et al. | |
| 6,210,094 B1 | 4/2001 | McNeilus et al. | |
| 6,213,706 B1 | 4/2001 | Christenson | |
| 6,224,318 B1 | 5/2001 | McNeilus et al. | |
| 6,315,515 B1 | 11/2001 | Young et al. | |
| 6,336,783 B1 | 1/2002 | Young et al. | |
| 6,350,098 B1 | 2/2002 | Christenson et al. | |
| 6,390,758 B1 | 5/2002 | McNeilus et al. | |
| 6,447,239 B2 | 9/2002 | Young et al. | |
| 6,474,928 B1 | 11/2002 | Christenson | |
| 6,565,305 B2 | 5/2003 | Schrafel | |
| 7,070,382 B2 | 7/2006 | Pruteanu et al. | |
| 7,073,620 B2 | 7/2006 | Braun et al. | |
| 7,198,130 B2 | 4/2007 | Schimke | |
| 7,258,194 B2 | 8/2007 | Braun et al. | |
| 7,284,943 B2 | 10/2007 | Pruteanu et al. | |
| 7,357,203 B2 | 4/2008 | Morrow et al. | |
| 7,448,460 B2 | 11/2008 | Morrow et al. | |
| 7,556,468 B2 | 7/2009 | Grata | |
| 7,559,735 B2 | 7/2009 | Pruteanu et al. | |
| 7,824,293 B2 | 11/2010 | Schimke | |
| 7,878,750 B2 | 2/2011 | Zhou et al. | |
| 7,931,103 B2 | 4/2011 | Morrow et al. | |
| 8,123,645 B2 | 2/2012 | Schimke | |
| 8,182,194 B2 | 5/2012 | Pruteanu et al. | |
| 8,215,892 B2 | 7/2012 | Calliari | |
| 8,337,352 B2 | 12/2012 | Morrow et al. | |
| 8,360,706 B2 | 1/2013 | Addleman et al. | |
| 8,540,475 B2 | 9/2013 | Kuriakose et al. | |
| 8,561,735 B2 | 10/2013 | Morrow et al. | |
| 8,807,613 B2 | 8/2014 | Howell et al. | |
| 8,864,613 B2 | 10/2014 | Morrow et al. | |
| 9,005,065 B2 | 4/2015 | Huang et al. | |
| 9,174,686 B1 | 11/2015 | Messina et al. | |
| 9,216,856 B2 | 12/2015 | Howell et al. | |
| 9,387,985 B2 | 7/2016 | Gillmore et al. | |
| 9,428,042 B2 | 8/2016 | Morrow et al. | |
| 9,650,032 B2 | 5/2017 | Kotloski et al. | |
| 9,651,120 B2 | 5/2017 | Morrow et al. | |
| 9,656,659 B2 | 5/2017 | Shukla et al. | |
| 9,707,869 B1 | 7/2017 | Messina et al. | |
| 9,880,581 B2 | 1/2018 | Kuriakose et al. | |
| 9,908,520 B2 | 3/2018 | Shukla et al. | |
| 9,970,515 B2 | 5/2018 | Morrow et al. | |
| 9,981,803 B2 | 5/2018 | Davis et al. | |
| 10,029,555 B2 | 7/2018 | Kotloski et al. | |
| 10,029,556 B2 | 7/2018 | Morrow et al. | |
| 10,160,438 B2 | 12/2018 | Shukla et al. | |
| 10,196,205 B2 | 2/2019 | Betz et al. | |
| 10,267,390 B2 | 4/2019 | Morrow et al. | |
| 10,357,995 B2 | 7/2019 | Palmer et al. | |
| 10,414,067 B2 | 9/2019 | Datema et al. | |
| 10,421,350 B2 | 9/2019 | Morrow et al. | |
| 10,435,026 B2 | 10/2019 | Shively et al. | |
| 10,457,134 B2 | 10/2019 | Morrow et al. | |
| 10,457,533 B2 | 10/2019 | Puszkiewicz et al. | |
| 10,558,234 B2 | 2/2020 | Kuriakose et al. | |
| 10,578,195 B2 | 3/2020 | Steinberger et al. | |
| 10,584,775 B2 | 3/2020 | Steinberger et al. | |
| 2002/0141855 A1 * | 10/2002 | Arrez | B65F 3/041 |
| | | | 414/408 |
| 2003/0130765 A1 * | 7/2003 | Pillar | B60L 50/15 |
| | | | 701/1 |
| 2005/0169734 A1 * | 8/2005 | Arrez | B65F 3/041 |
| | | | 414/406 |
| 2007/0166136 A1 * | 7/2007 | Arrez | B65F 3/041 |
| | | | 414/406 |
| 2007/0183872 A1 * | 8/2007 | Arrez | B65F 3/046 |
| | | | 414/408 |
| 2013/0251485 A1 * | 9/2013 | Howell | B65F 3/143 |
| | | | 414/408 |
| 2017/0341860 A1 * | 11/2017 | Dodds | B65F 1/122 |
| 2018/0250847 A1 | 9/2018 | Wurtz et al. | |
| 2018/0326832 A1 | 11/2018 | Kotloski et al. | |
| 2019/0091890 A1 | 3/2019 | Rocholl et al. | |
| 2019/0111910 A1 | 4/2019 | Shukla et al. | |
| 2019/0121353 A1 | 4/2019 | Datema et al. | |
| 2019/0161272 A1 | 5/2019 | Betz et al. | |
| 2019/0193934 A1 | 6/2019 | Rocholl et al. | |
| 2019/0242460 A1 | 8/2019 | Morrow et al. | |
| 2019/0322321 A1 | 10/2019 | Schwartz et al. | |
| 2019/0325220 A1 | 10/2019 | Wildgrube et al. | |
| 2019/0344475 A1 | 11/2019 | Datema et al. | |
| 2019/0360600 A1 | 11/2019 | Jax et al. | |
| 2019/0366828 A1 | 12/2019 | Morrow et al. | |
| 2020/0039341 A1 | 2/2020 | Morrow et al. | |
| 2020/0078986 A1 | 3/2020 | Clifton et al. | |
| 2020/0102145 A1 | 4/2020 | Nelson et al. | |
| 2020/0200237 A1 | 6/2020 | Steinberger et al. | |
| 2020/0200238 A1 | 6/2020 | Steinberger et al. | |
| 2020/0230841 A1 | 7/2020 | Datema et al. | |
| 2020/0230842 A1 | 7/2020 | Datema et al. | |
| 2020/0262328 A1 | 8/2020 | Nelson et al. | |
| 2020/0262366 A1 | 8/2020 | Wildgrube et al. | |
| 2020/0265656 A1 | 8/2020 | Koga et al. | |

FOREIGN PATENT DOCUMENTS

| | | | | |
|---|---|---|---|---|
| DE | 202011004125 U1 * | 5/2011 | ............. | B65F 3/046 |
| EP | 0675058 A1 * | 10/1995 | ............. | B65F 3/046 |
| EP | 2457850 A1 * | 5/2012 | ............. | B65F 3/046 |
| EP | 2949603 A1 * | 12/2015 | ............. | B65F 3/046 |
| KR | 100963567 B1 * | 6/2010 | ............. | B65F 3/046 |

* cited by examiner

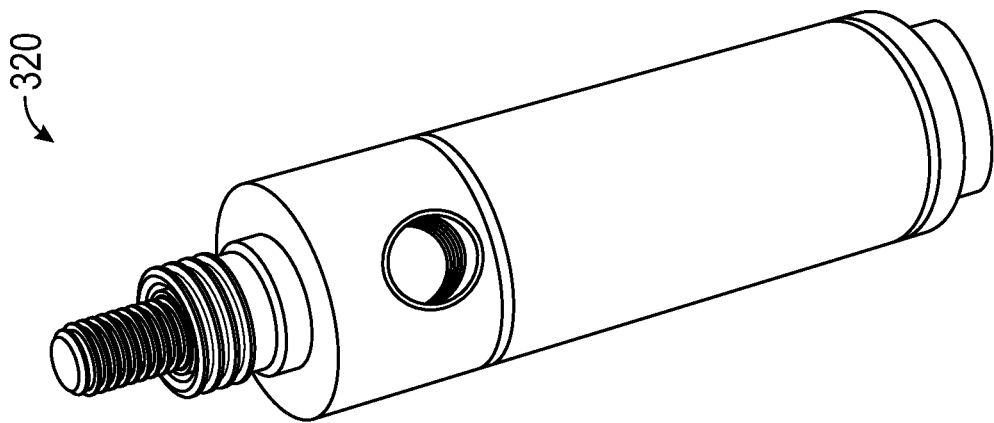
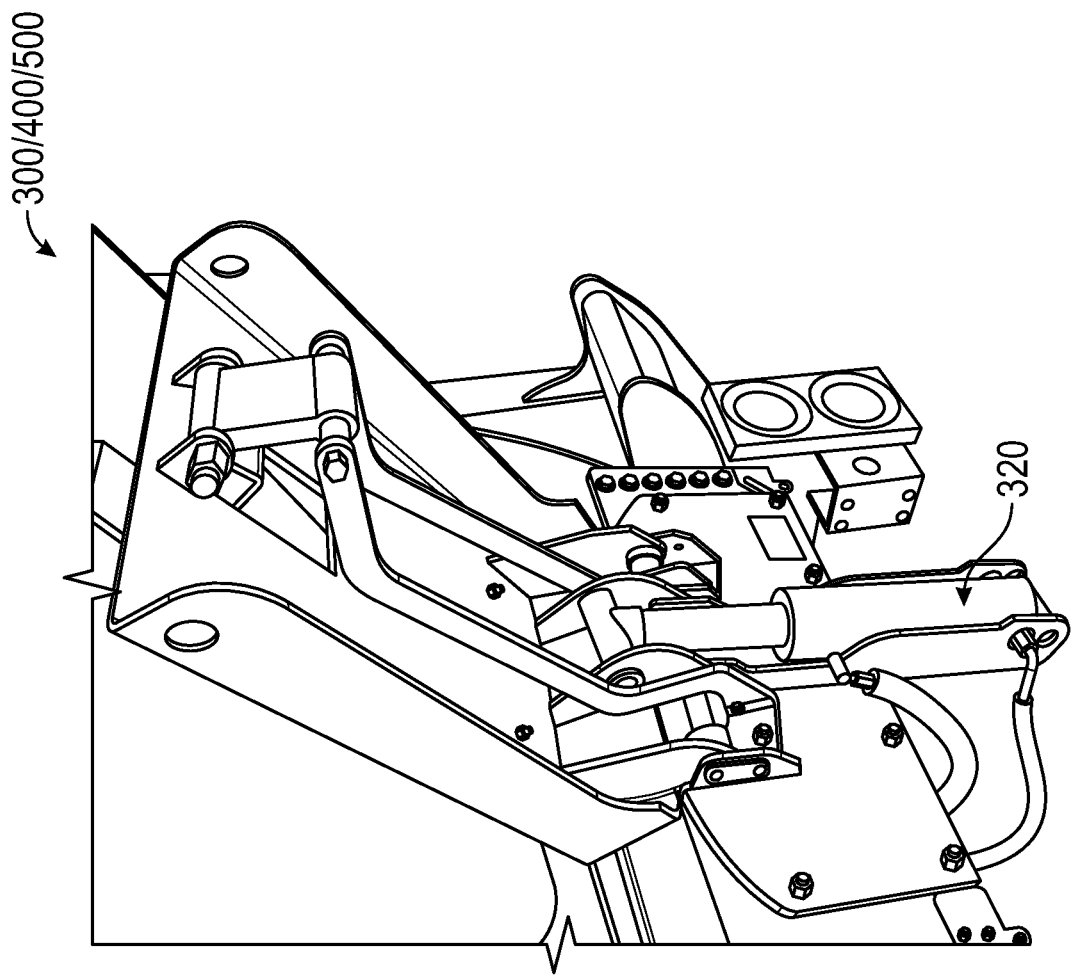

REAR LIFT ASSEMBLY FOR REFUSE VEHICLE

CROSS-REFERENCE TO RELATED PATENT APPLICATION

This application claims the benefit of U.S. Provisional Patent Application No. 62/842,919, filed May 3, 2019, which is incorporated herein by reference in its entirety.

BACKGROUND

Refuse vehicles collect a wide variety of waste, trash, and other material from residences and businesses. Operators of the refuse vehicles transport the material from various waste receptacles within a municipality to a storage or processing facility (e.g., a landfill, an incineration facility, a recycling facility, etc.).

SUMMARY

One embodiment relates to a tipper assembly for a refuse vehicle. The tipper assembly includes a base configured to couple to a tailgate of the refuse vehicle, an actuator powered by electric energy, an arm extending from and pivotally coupled to at least one of the actuator or the base, and an implement coupled to the arm. The implement is configured to engage with a refuse container such that operation of the actuator facilitates pivoting the implement and the refuse container from a base position to a dump position to dump contents within the refuse container into an opening in the tailgate.

Another embodiment relates to a tipper assembly for a refuse vehicle. The tipper assembly includes a base, a pivot actuator, a first pair of arms, a first engagement assembly, a second engagement assembly, and a second pair of arms. The base is configured to couple to a tailgate of the refuse vehicle. The pivot actuator is coupled to the base. Each arm of the first pair of arms includes a first end pivotally coupled to the pivot actuator, an opposing second end having a rod extending therefrom, and an interface extending inward from an inner face thereof. The first engagement assembly includes a first bracket coupled to the interface of each arm of the first pair of arms and a first retainer disposed along the first bracket. The second engagement assembly includes a pair of cylinders, a second bracket extending between the pair of cylinders, and a second retainer disposed along the second bracket. Each cylinder of the pair of cylinders receives the rod of a respective one of the first pair of arms. Each arm of the second pair of arms is pivotally coupled to and extends between the base and a respective cylinder of the pair of cylinders. The rods and the cylinders translate relative to each other as the first pair of arms are pivoted by the pivot actuator such that a distance between the first retainer and the second retainer varies.

Still another embodiment relates to a tipper assembly for a refuse vehicle. The tipper assembly includes a base configured to couple to a tailgate of the refuse vehicle, a pivot actuator coupled to the base, a first arm positioned proximate a first end of the pivot actuator, a second arm positioned proximate an opposing second end of the pivot actuator, an implement coupled to the first arm and the second arm, and a transmission connecting the pivot actuator to at least one of the first arm or the second arm. The transmission is driven by the pivot actuator. The transmission facilitates pivoting the implement from a base position to a dump position. The transmission facilitates providing a shake function when the implement is at the dump position.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

FIGS. 19-22 show various types of actuators usable with the lift assembly of FIG. 2 other than an electric motor, according to various exemplary embodiments.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a refuse vehicle includes a rear lift assembly coupled to a tailgate of the refuse vehicle. The rear lift assembly includes a base, an electric actuator coupled to the base, an implement, and an arm extending between the electric actuator and the implement such that the implement is pivotally coupled to the base. The electric actuator is configured to pivot the implement between a first position and a second position to facilitate emptying contents from a refuse container interfacing with the implement into a refuse compartment of the refuse vehicle through the tailgate.

Overall Vehicle

Figure 1:
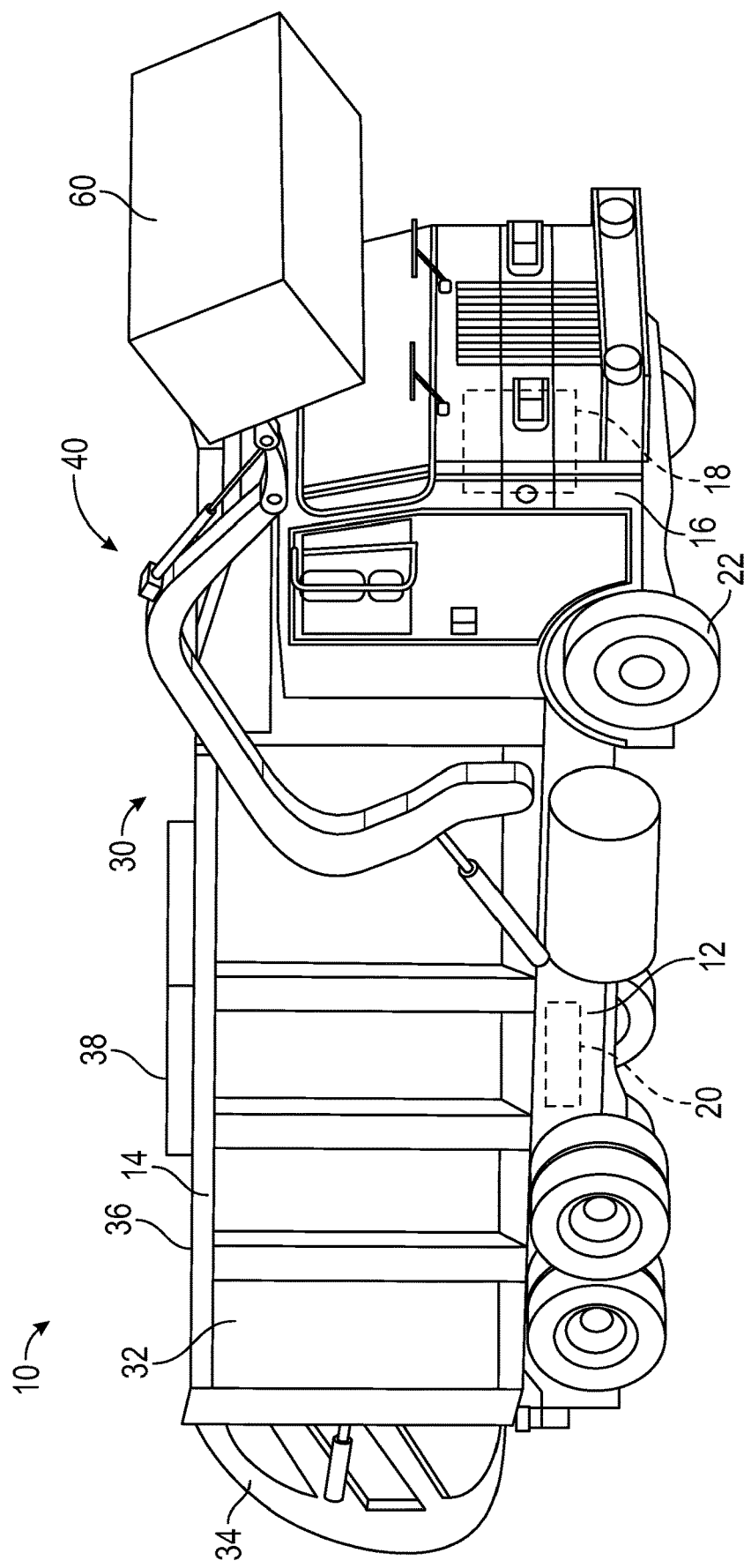
FIG. 1 is a front perspective view of a refuse vehicle, according to an exemplary embodiment.

As shown in FIG. 1, a vehicle, shown as refuse vehicle 10 (e.g., a garbage truck, a waste collection truck, a sanitation truck, a recycling truck, etc.), is configured as a front-loading refuse truck. In other embodiments, the refuse vehicle 10 is configured as a side-loading refuse truck or a rear-loading refuse truck (see, e.g., FIG. 2). In still other embodiments, the vehicle is another type of vehicle (e.g., a skid-loader, a telehandler, a plow truck, a boom lift, etc.). As shown in FIG. 1, the refuse vehicle 10 includes a chassis, shown as frame 12; a body assembly, shown as body 14, coupled to the frame 12 (e.g., at a rear end thereof, etc.); and a cab, shown as cab 16, coupled to the frame 12 (e.g., at a front end thereof, etc.). The cab 16 may include various components to facilitate operation of the refuse vehicle 10 by an operator (e.g., a seat, a steering wheel, actuator controls, a user interface, switches, buttons, dials, etc.).

As shown in FIG. 1, the refuse vehicle 10 includes a prime mover, shown as electric motor 18, and an energy system, shown as energy storage and/or generation system 20. In other embodiments, the prime mover is or includes an internal combustion engine. According to the exemplary embodiment shown in FIG. 1, the electric motor 18 is coupled to the frame 12 at a position beneath the cab 16. The electric motor 18 is configured to provide power to a plurality of tractive elements, shown as wheels 22 (e.g., via a drive shaft, axles, etc.). In other embodiments, the electric motor 18 is otherwise positioned and/or the refuse vehicle 10 includes a plurality of electric motors to facilitate independently driving one or more of the wheels 22. In still other embodiments, the electric motor 18 or a secondary electric motor is coupled to and configured to drive a hydraulic system that powers hydraulic actuators. According to the exemplary embodiment shown in FIG. 1, the energy storage and/or generation system 20 is coupled to the frame 12 beneath the body 14. In other embodiments, the energy storage and/or generation system 20 is otherwise positioned (e.g., within a tailgate of the refuse vehicle 10, beneath the cab 16, along the top of the body 14, within the body 14, etc.).

According to an exemplary embodiment, the energy storage and/or generation system 20 is configured to (a) receive, generate, and/or store power and (b) provide electric power to (i) the electric motor 18 to drive the wheels 22, (ii) electric actuators of the refuse vehicle 10 to facilitate operation thereof (e.g., lift actuators, tailgate actuators, packer actuators, grabber actuators, etc.), and/or (iii) other electrically operated accessories of the refuse vehicle 10 (e.g., displays, lights, etc.). The energy storage and/or generation system 20 may include one or more rechargeable batteries (e.g., lithium-ion batteries, nickel-metal hydride batteries, lithium-ion polymer batteries, lead-acid batteries, nickel-cadmium batteries, etc.), capacitors, solar cells, generators, power buses, etc. In one embodiment, the refuse vehicle 10 is a completely electric refuse vehicle. In other embodiments, the refuse vehicle 10 includes an internal combustion generator that utilizes one or more fuels (e.g., gasoline, diesel, propane, natural gas, hydrogen, etc.) to generate electricity to charge the energy storage and/or generation system 20, power the electric motor 18, power the electric actuators, and/or power the other electrically operated accessories (e.g., a hybrid refuse vehicle, etc.). For example, the refuse vehicle 10 may have an internal combustion engine augmented by the electric motor 18 to cooperatively provide power to the wheels 22. The energy storage and/or generation system 20 may thereby be charged via an on-board generator (e.g., an internal combustion generator, a solar panel system, etc.), from an external power source (e.g., overhead power lines, mains power source through a charging input, etc.), and/or via a power regenerative braking system, and provide power to the electrically operated systems of the refuse vehicle 10. In some embodiments, the energy storage and/or generation system 20 includes a heat management system (e.g., liquid cooling, heat exchanger, air cooling, etc.).

According to an exemplary embodiment, the refuse vehicle 10 is configured to transport refuse from various waste receptacles within a municipality to a storage and/or processing facility (e.g., a landfill, an incineration facility, a recycling facility, etc.). As shown in FIG. 1, the body 14 includes a plurality of panels, shown as panels 32, a tailgate 34, and a cover 36. The panels 32, the tailgate 34, and the cover 36 define a collection chamber (e.g., hopper, etc.), shown as refuse compartment 30. Loose refuse may be placed into the refuse compartment 30 where it may thereafter be compacted (e.g., by a packer system, etc.). The refuse compartment 30 may provide temporary storage for refuse during transport to a waste disposal site and/or a recycling facility. In some embodiments, at least a portion of the body 14 and the refuse compartment 30 extend above or in front of the cab 16. According to the embodiment shown in FIG. 1, the body 14 and the refuse compartment 30 are positioned behind the cab 16. In some embodiments, the refuse compartment 30 includes a hopper volume and a storage volume. Refuse may be initially loaded into the hopper volume and thereafter compacted into the storage volume. According to an exemplary embodiment, the hopper volume is positioned between the storage volume and the cab 16 (e.g., refuse is loaded into a position of the refuse compartment 30 behind the cab 16 and stored in a position further toward the rear of the refuse compartment 30, a front-loading refuse vehicle, a side-loading refuse vehicle, etc.). In other embodiments, the storage volume is positioned between the hopper volume and the cab 16 (e.g., a rear-loading refuse vehicle, etc.).

As shown in FIG. 1, the refuse vehicle 10 includes a lift mechanism/system (e.g., a front-loading lift assembly, etc.), shown as lift assembly 40, coupled to the front end of the body 14. In other embodiments, the lift assembly 40 extends rearward of the body 14 (e.g., a rear-loading refuse vehicle, etc.). In still other embodiments, the lift assembly 40 extends from a side of the body 14 (e.g., a side-loading refuse vehicle, etc.). As shown in FIG. 1, the lift assembly 40 is configured to engage a container (e.g., a residential trash receptacle, a commercial trash receptacle, a container having a robotic grabber arm, etc.), shown as refuse container 60. The lift assembly 40 may include various actuators (e.g., electric actuators, hydraulic actuators, pneumatic actuators, etc.) to facilitate engaging the refuse container 60, lifting the refuse container 60, and tipping refuse out of the refuse container 60 into the hopper volume of the refuse compartment 30 through an opening in the cover 36 or through the tailgate 34. The lift assembly 40 may thereafter return the empty refuse container 60 to the ground. According to an exemplary embodiment, a door, shown as top door 38, is movably coupled along the cover 36 to seal the opening thereby preventing refuse from escaping the refuse compartment 30 (e.g., due to wind, bumps in the road, etc.).

Rear-Loading Lift Assembly

Figure 2:
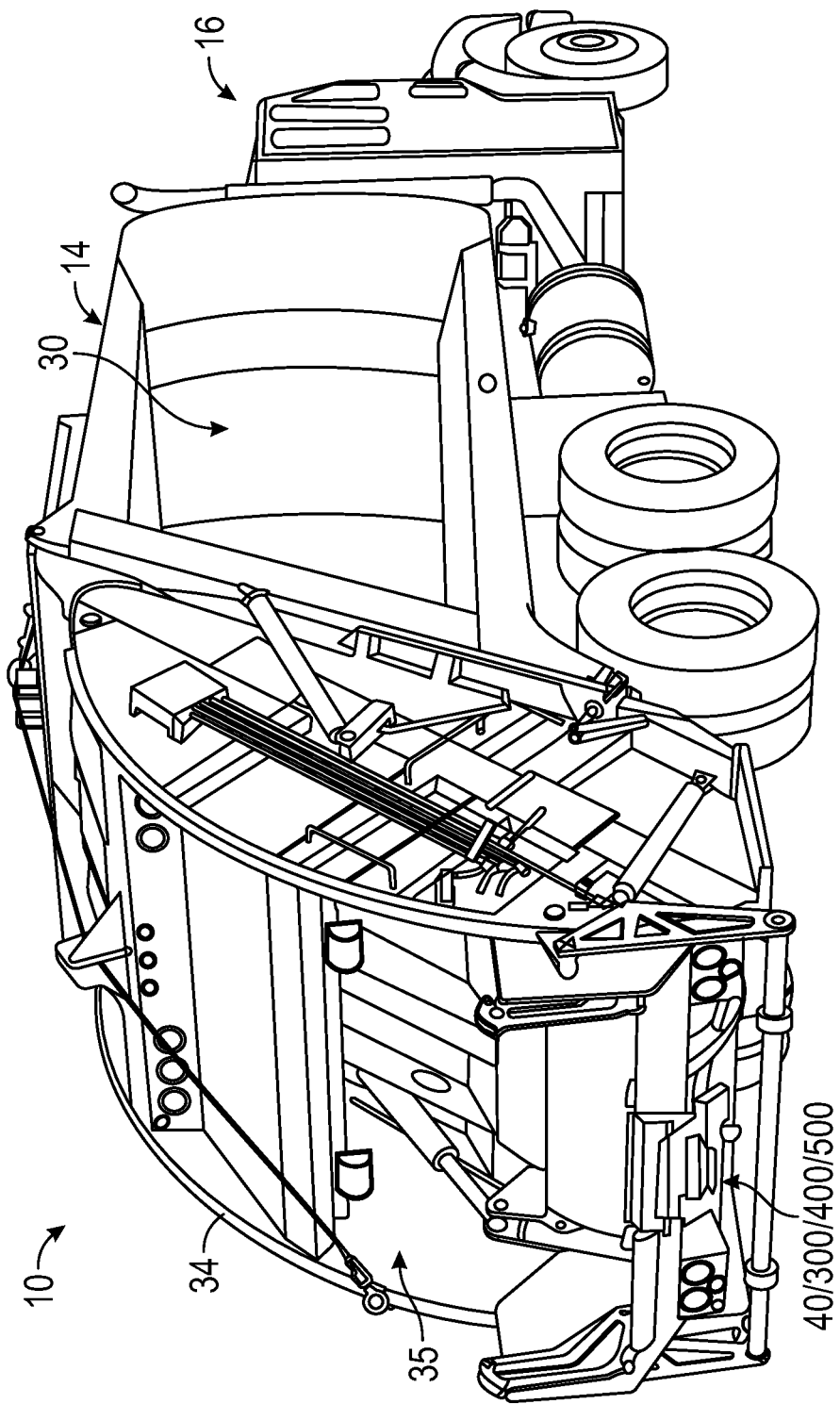
FIG. 2 is a rear perspective of the refuse vehicle of FIG. 1 having a rear lift assembly, according to an exemplary embodiment.

As shown in FIG. 2, the lift assembly 40 is configured as a rear-loading lift assembly. According to an exemplary embodiment shown in FIG. 2, the lift assembly 40 is configured to facilitate lifting the refuse container 60 to dump the contents therein (e.g., trash, recyclables, etc.) into the refuse compartment 30 through an opening, shown as hopper opening 35, in the tailgate 34.

As shown in FIGS. 3-6, the rear-loading lift assembly is a first lift assembly (e.g., a tipper assembly, etc.), shown as lift assembly 300. As shown in FIGS. 3-6, the lift assembly 300 includes a base, shown as base plate 302, having first supports, shown as supports 304, extending therefrom and second supports, shown as supports 306, extending therefrom and positioned at opposing ends of the base plate 302. According to an exemplary embodiment, the base plate 302 is configured to facilitate coupling the lift assembly 300 to the tailgate 34 of the refuse vehicle 10.

Figure 3:
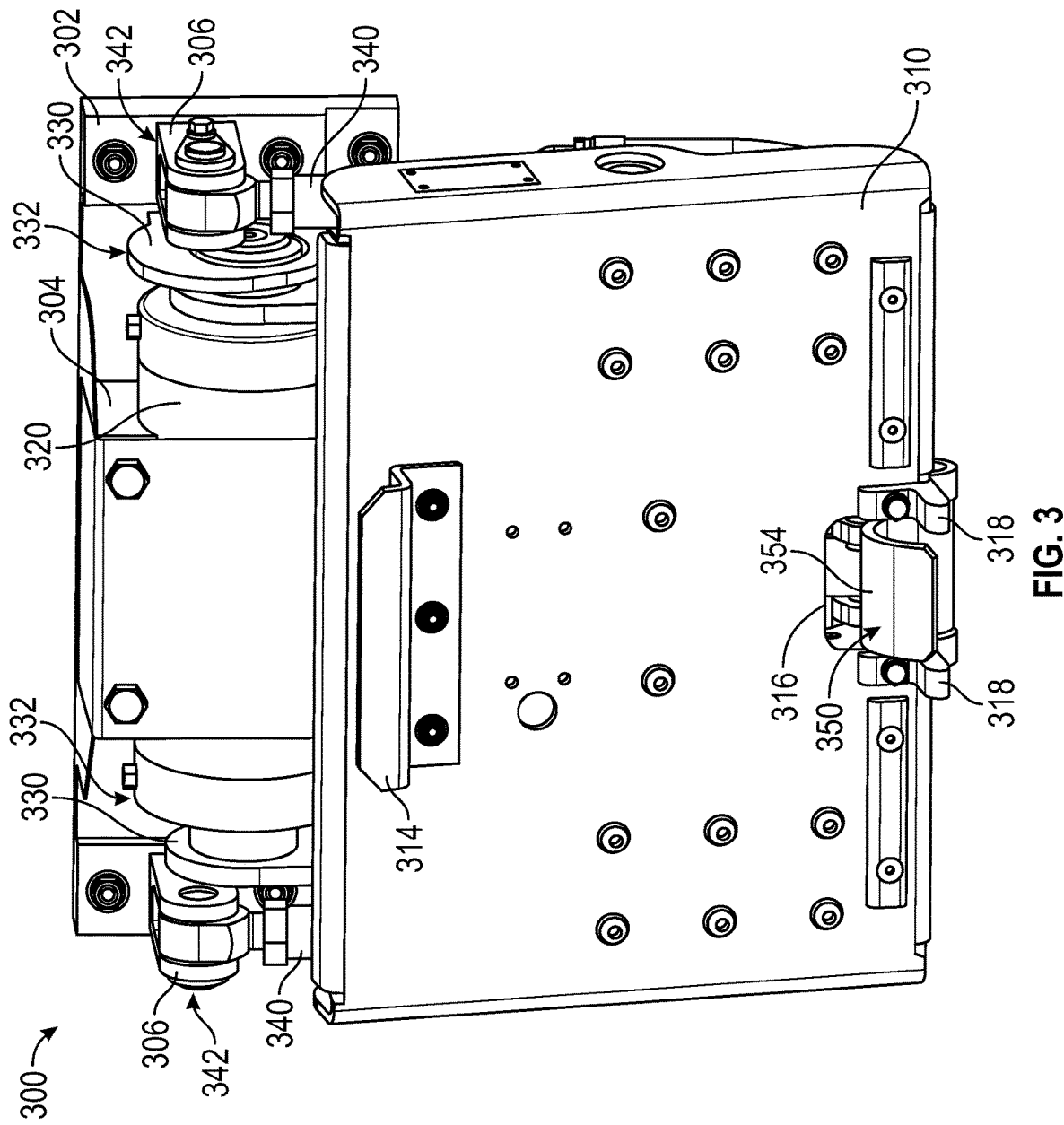
FIG. 3 is a front perspective view of the lift assembly of FIG. 2 in a first orientation, according to an exemplary embodiment.
Figure 4:
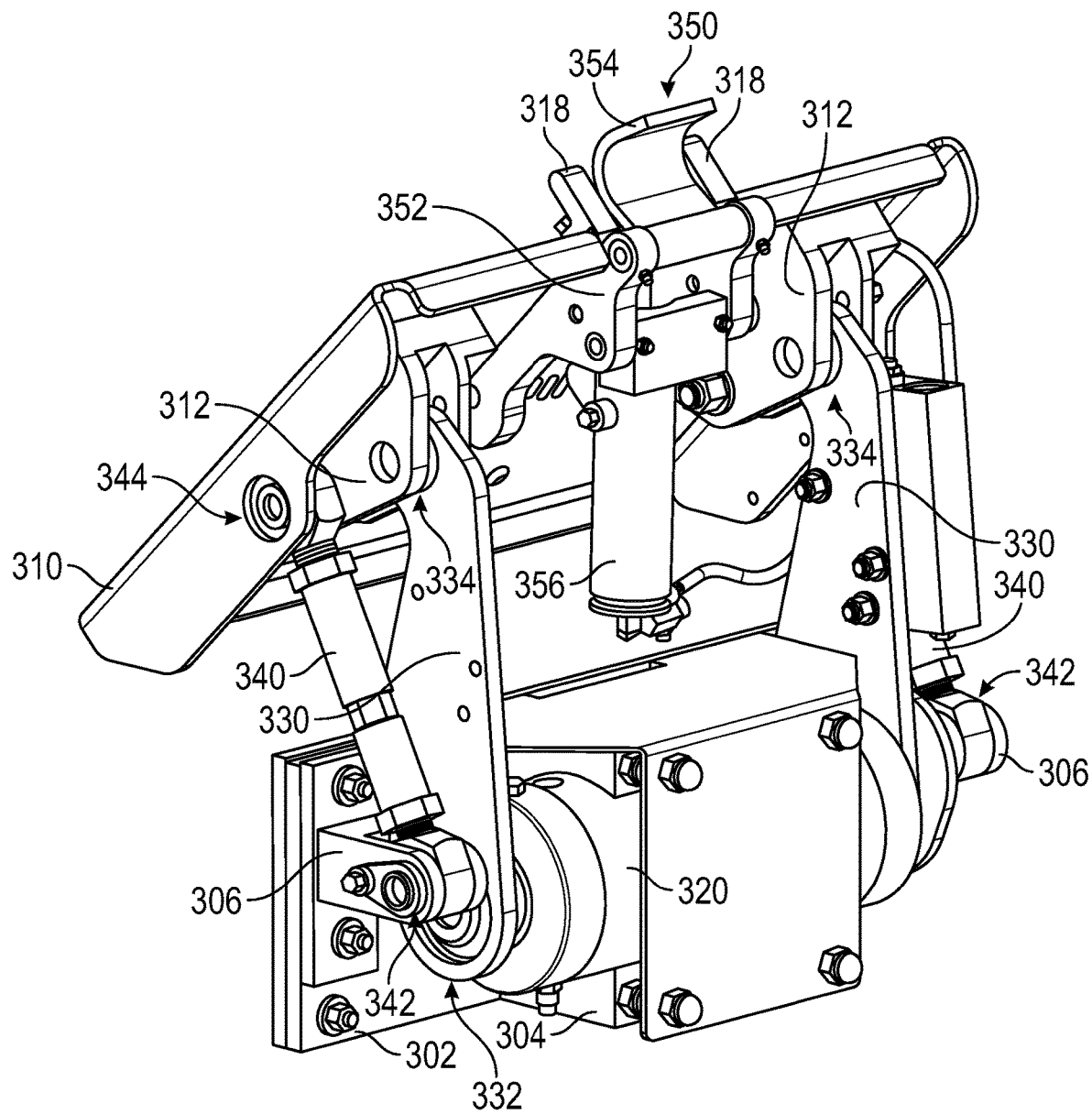
FIG. 4 is a front perspective view of the lift assembly of FIG. 3 in a second orientation, according to an exemplary embodiment.
Figure 5:
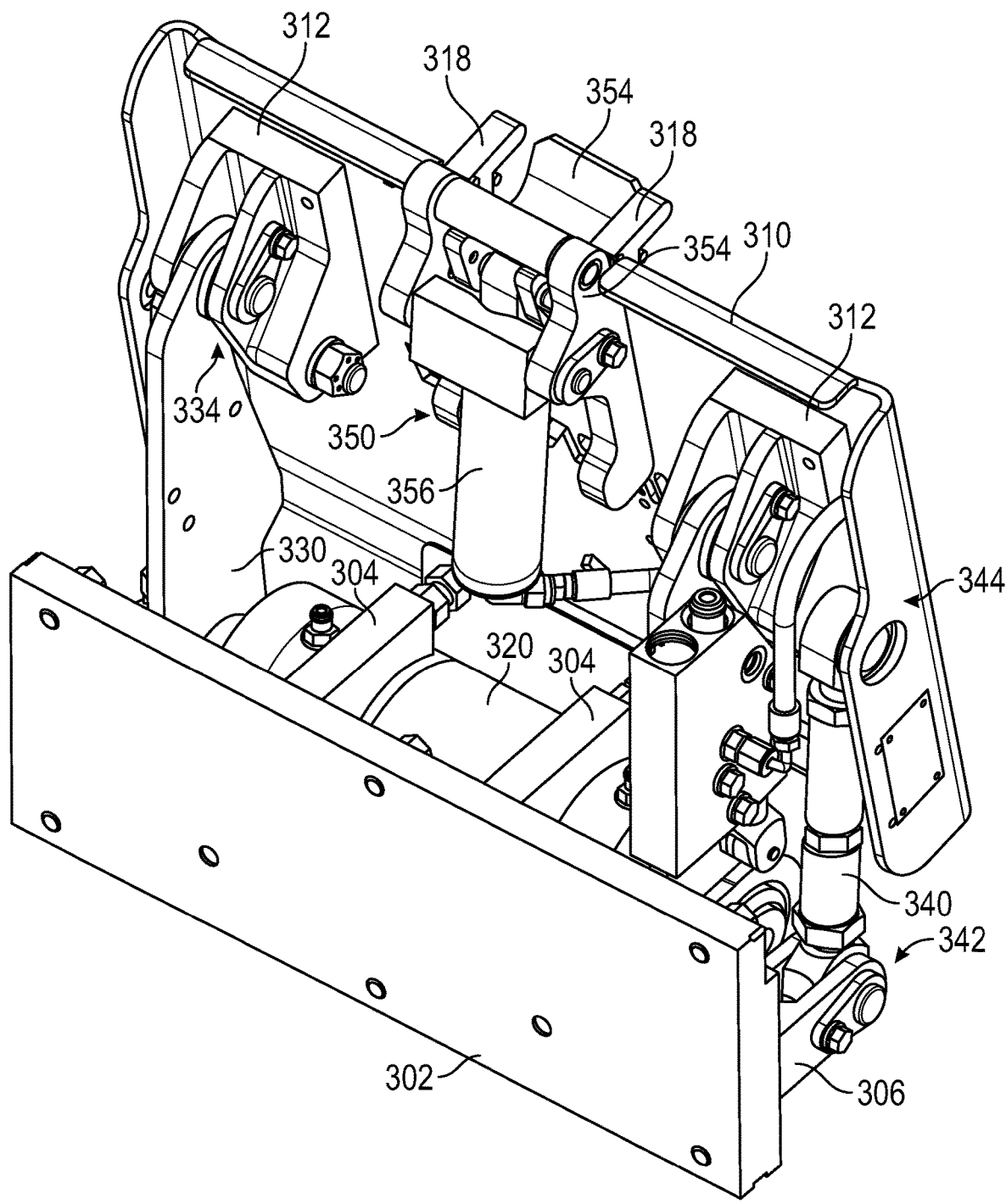
FIG. 5 is a bottom, rear perspective view of the lift assembly of FIG. 3, according to an exemplary embodiment.
Figure 6:
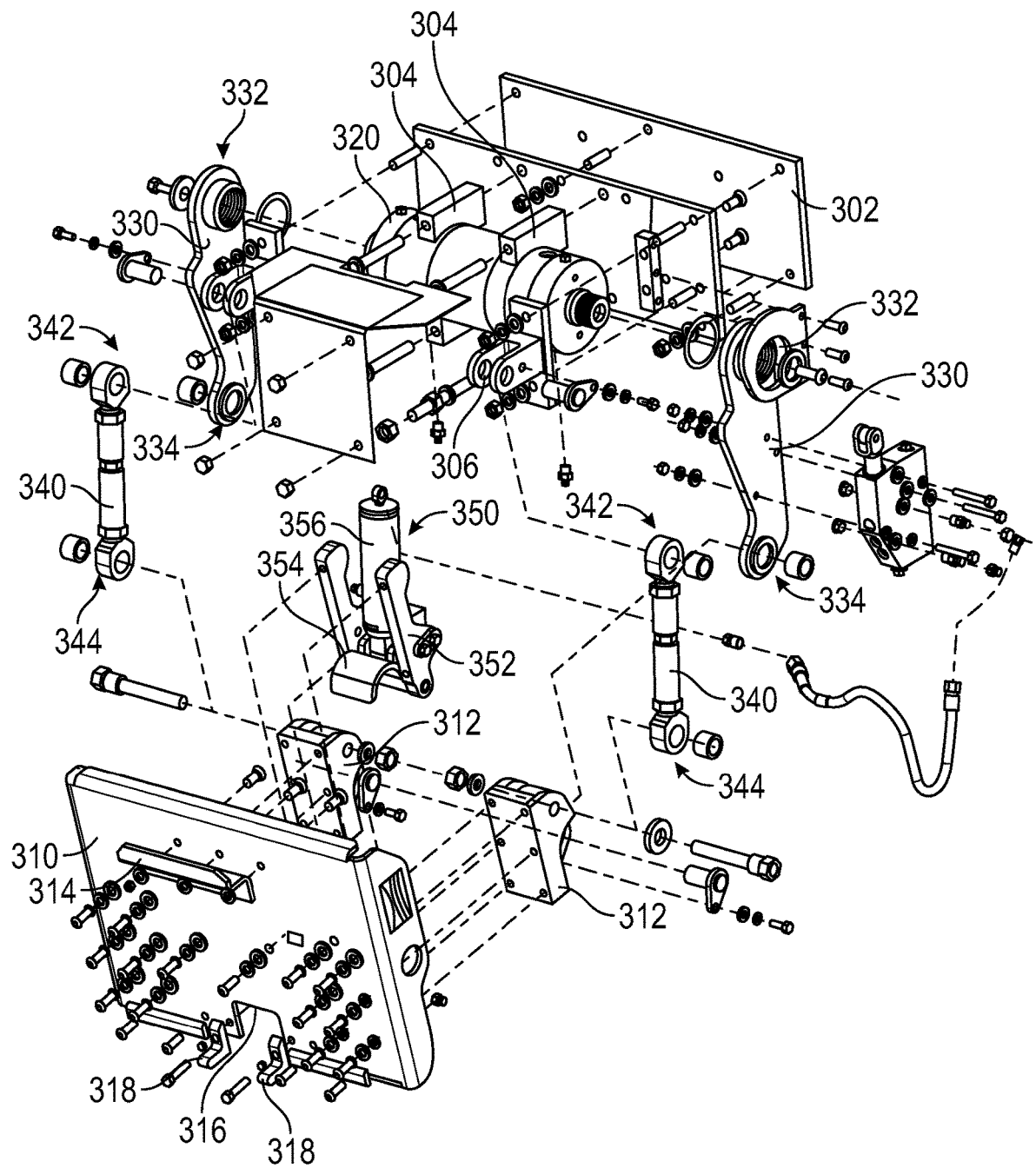
FIG. 6 is an exploded view of the lift assembly of FIG. 3, according to an exemplary embodiment.

As shown in FIGS. 3-6, the lift assembly 300 includes an implement, shown as engagement plate 310. As shown in FIGS. 4-6, the engagement plate 310 has a pair of brackets, shown as coupling brackets 312, disposed along a rear surface thereof. As shown in FIGS. 3 and 6, the engagement plate 310 includes a first interface, shown as upper retainer 314, disposed along a front surface thereof. As shown in FIGS. 3 and 6, the engagement plate 310 defines a notch, shown as cutout 316, along a bottom edge thereof and in alignment with the upper retainer 314. As shown in FIGS. 3-6, the engagement plate 310 includes a second interface, shown as lower retainers 318, disposed along the bottom edge thereof on each side of the cutout 316.

As shown in FIGS. 3-6, the lift assembly 300 includes a first actuator, shown as pivot actuator 320, coupled to the supports 304 of the base plate 302. According to an exemplary embodiment, the pivot actuator 320 is an electric actuator configured to be powered via electricity provided by the energy storage and/or generation system 20 or another electrical source on the refuse vehicle 10 (e.g., a generator, solar panels, etc.). According to the exemplary embodiment shown in FIGS. 3-6, the pivot actuator 320 is a rotational electric actuator (e.g., an electric motor, etc.). In some embodiments, the pivot actuator 320 is a linear electric actuator (e.g., a ball screw linear actuator driven by an electric motor, a lead screw actuator driven by an electric motor, etc.). In an alternative embodiment, the pivot actuator 320 is a fluidly operated actuator (e.g., a hydraulic cylinder, a hydraulic rotary actuator, a pneumatic cylinder, a pneumatic rotary vane, etc.) operated by a fluid pump (e.g., a hydraulic pump, a pneumatic pump, etc.) driven by an electric motor (e.g., the electric motor 18, the secondary electric motor, an integrated motor of the fluid pump, etc.) (see, e.g., FIGS. 20-22).

As shown in FIGS. 3-6, the lift assembly 300 includes a first pair of arms, shown as rotational arms 330. Each of the rotational arms 330 includes (i) a first end, shown as base end 332, pivotally coupled to a respective end of the pivot actuator 320 and (ii) an opposing second end, shown as implement end 334, pivotally coupled to a respective one of the coupling brackets 312 disposed along the rear surface of the engagement plate 310, thereby coupling the engagement plate 310 to the pivot actuator 320. According to the exemplary embodiment shown in FIGS. 3 and 4, the base ends 332 of the rotational arms 330 are directly coupled to the pivot actuator 320. In other embodiments, the lift assembly 300 includes a gear arrangement or transmission device (e.g., an inline transmission device, a planetary or epicyclic gearbox, a cycloidal drive, a harmonic drive, an intermediary transmission device, eccentric gearing, parallel axis gearing, a double-reduction worm gear assembly, etc.) positioned between the pivot actuator 320 and the rotational arms 330.

As shown in FIGS. 3-6, the lift assembly 300 includes a second pair of arms, shown as idler arms 340. Each of the idler arms 340 includes (i) a first end, shown as base end 342, pivotally coupled to a respective one of the supports 306 disposed along the base plate 302, and (ii) an opposing second end, shown as implement end 344, pivotally coupled to a respective one of the coupling brackets 312 disposed along the rear surface of the engagement plate 310. According to an exemplary embodiment, the length of the idler arms 340 is selectively adjustable (e.g., increased, decreased, etc.) to modify an angle of the engagement plate 310 relative to the base plate 302 (e.g., tilt the engagement plate 310 forward, backward, etc.).

As shown in FIGS. 3-6, the lift assembly 300 includes a locking system, shown as locking assembly 350. As shown in FIGS. 4-6, the locking assembly 350 includes a coupler, shown as locking assembly bracket 352, coupled to the rear surface of the engagement plate 310, proximate the cutout 316. As shown in FIGS. 3-6, the locking assembly 350 includes a movable retainer, shown as clamp 354, pivotally coupled to the locking assembly bracket 352 and positioned such that the clamp 354 extends through the cutout 316 of the engagement plate 310. As shown in FIGS. 4-6, the locking assembly 350 includes a second actuator, shown as locking actuator 356, coupled to the locking assembly bracket 352 and positioned to facilitate selectively locking the clamp 354 in place to prevent rotation thereof. According to an exemplary embodiment, the locking actuator 356 is an electric actuator configured to be powered via electricity provided by the energy storage and/or generation system 20 or another electrical source on the refuse vehicle 10 (e.g., a generator, solar panels, etc.). According to an exemplary embodiment, the locking actuator 356 is a linear actuator configured to extend and retract to selectively, pivotally fix the clamp 354 in place. In one embodiment, the locking actuator 356 is or includes a ball screw driven by an electric motor (e.g., a linear, mechanical actuator, etc.). In other embodiments, another type of electrically driven, linear actuator is used (e.g., a lead screw actuator, etc.). In another embodiment, the locking actuator 356 is a rotational actuator. In an alternative embodiment, the locking actuator 356 is a fluidly operated actuator (e.g., a hydraulic cylinder, a pneumatic cylinder, a pneumatic rotary vane, etc.) operated by a fluid pump (e.g., a hydraulic pump, a pneumatic pump, etc.) driven by an electric motor (e.g., the electric motor 18, the secondary electric motor, an integrated motor of the fluid pump, etc.).

According to an exemplary embodiment, the pivot actuator 320 is selectively controllable to pivot the engagement plate 310 between a first position or base position, as shown in FIG. 3, and a second position or dump position, as shown in FIG. 4. According to an exemplary embodiment, the upper retainer 314 and the lower retainers 318 are configured to engage a first interface (e.g., a lip, etc.) and a second interface (e.g., a bar, etc.), respectively, of the refuse container 60 when the engagement plate 310 is in the base position. The clamp 354 may freely pivot and lie on top of the second interface when the engagement plate 310 is in the base position such that the second interface is positioned between the lower retainers 318 and the clamp 354. However, the locking actuator 356 may be configured to lock the clamp 354 in place when the pivot actuator 320 pivots the engagement plate 310 into the dump position (e.g., immediately once the pivot actuator 320 is activated, once the engagement plate 310 reaches a predetermined angle, etc.). Such locking of the clamp 354 may thereby prevent the refuse container 60 from dislodging from the engagement plate 310 when pivoted to empty the contents within the refuse container 60. The locking actuator 356 may thereafter be configured to unlock the clamp 354 in response to the pivot actuator 320 returning the engagement plate 310 to the initial, base position (e.g., once the engagement plate 310 is no longer in motion, once the engagement plate 310 reaches a predefined angle, etc.) so that the refuse container 60 can be removed from the engagement plate 310 by an operator.

Figure 8:
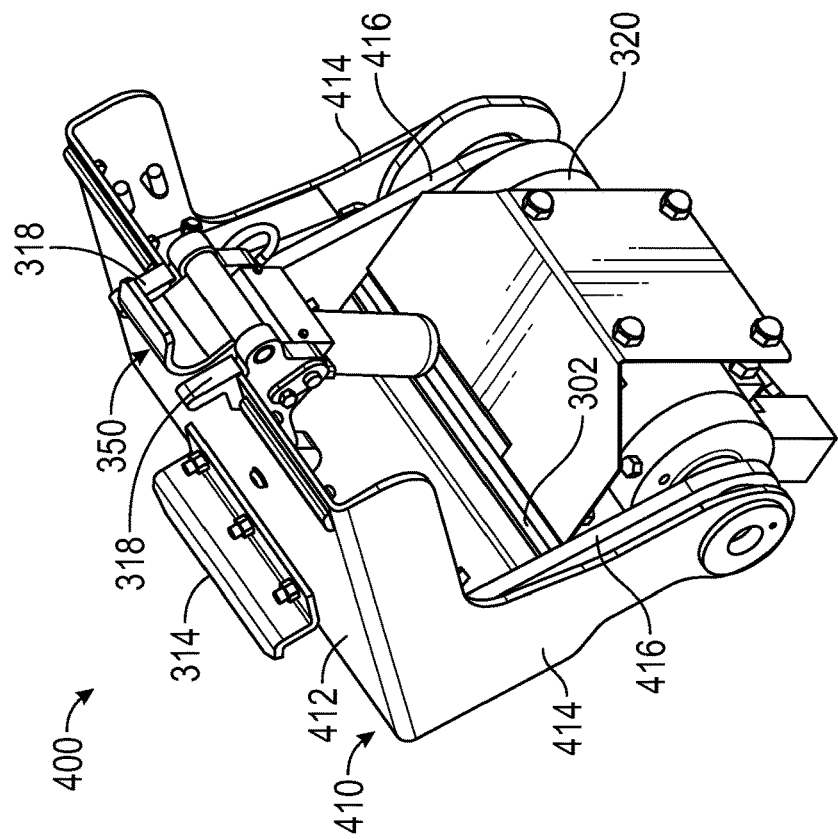
FIG. 8 is a front perspective view of the lift assembly of FIG. 7 in a second orientation, according to an exemplary embodiment.
Figure 7:
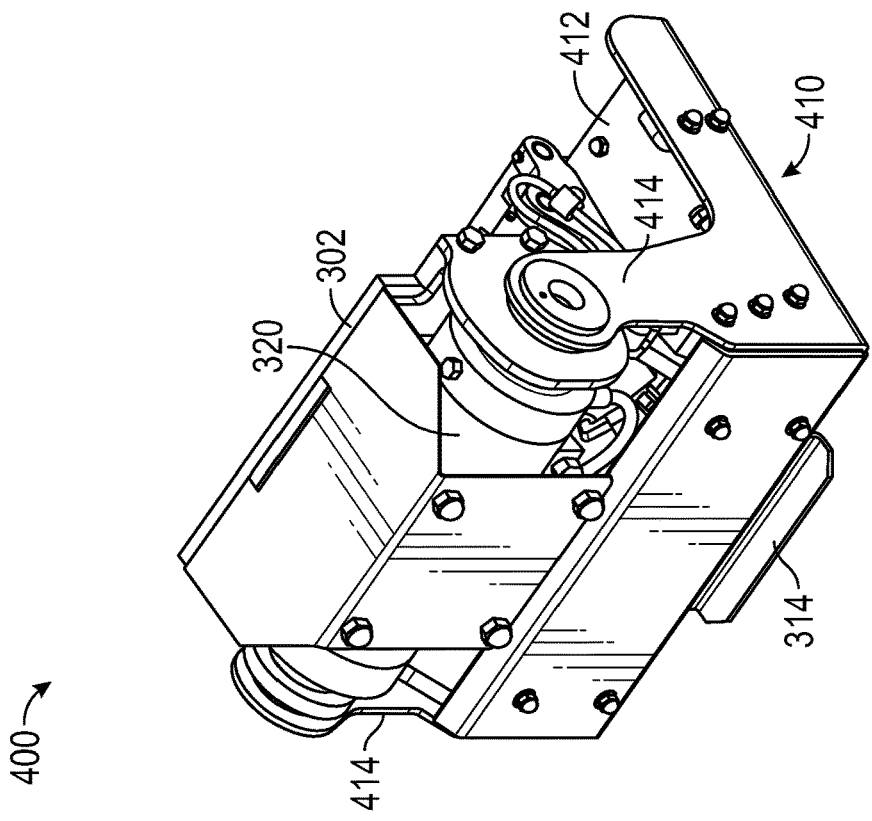
FIG. 7 is a front perspective view of the lift assembly of FIG. 2 in a first orientation, according to another exemplary embodiment.

As shown in FIGS. 7 and 8, the rear-loading lift assembly is a second lift assembly (e.g., a tipper assembly, etc.), shown as lift assembly 400. The lift assembly 400 may be similar to the lift assembly 300 except the engagement plate 310, the rotational arms 330, and the idler arms 340 may be replaced with a unitary structure, shown as implement 410. As shown in FIGS. 7 and 8, the implement 410 includes a front plate, shown as engagement plate 412, having a first pair of arms, shown as outer arms 414, extending from and integrally formed with the engagement plate 412. The outer arms 414 are coupled to the pivot actuator 320 such that the engagement of the pivot actuator 320 facilitates selectively pivoting the outer arms 414 and, thereby, the engagement plate 412 therewith, between the base position, as shown in FIG. 7, and the dump position, as shown in FIG. 8. As shown in FIG. 8, the implement 410 includes a second pair of arms, shown as inner arms 416, spaced from and positioned between the outer arms 414. According to an exemplary embodiment, the inner arms 416 extend from and are integrally formed with the engagement plate 412. As shown in FIG. 8, the inner arms 416 are coupled to the pivot actuator 320. The inner arms 416 may, therefore, provide extra support and stability to the implement 410. In some embodiments, the implement 410 does not includes the inner arms 416.

Figure 9:
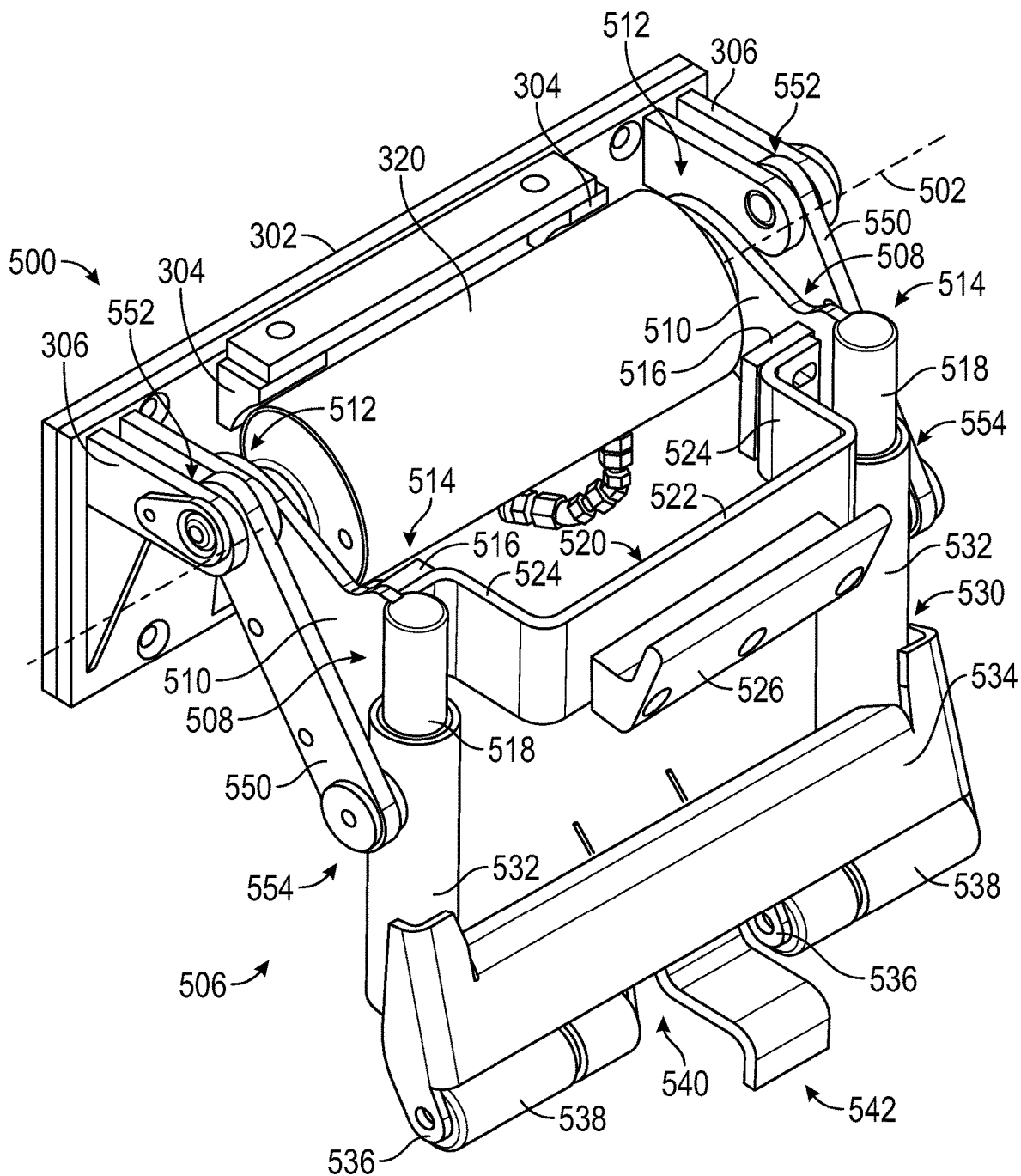
FIG. 9 is a front perspective view of the lift assembly of FIG. 2, according to still another exemplary embodiment.
Figure 11:
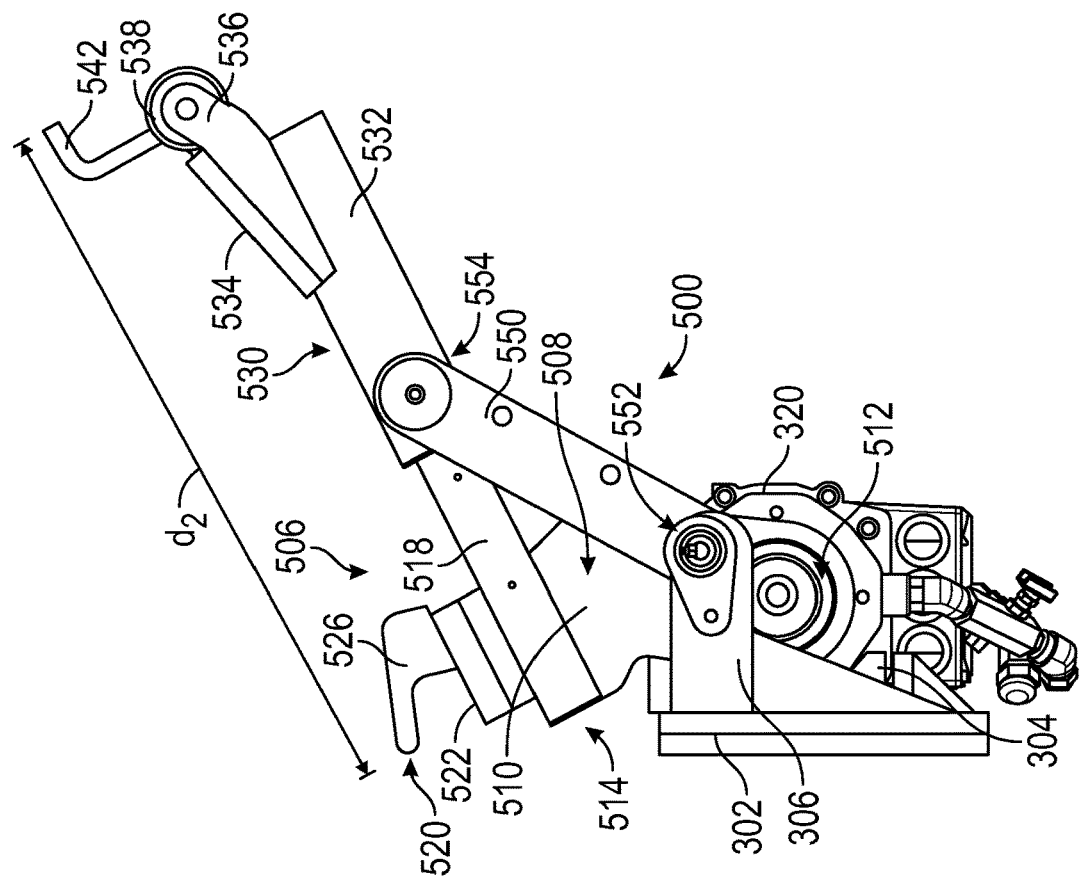
FIG. 11 is a side view of the lift assembly of FIG. 9 in a second orientation, according to an exemplary embodiment.
Figure 10:
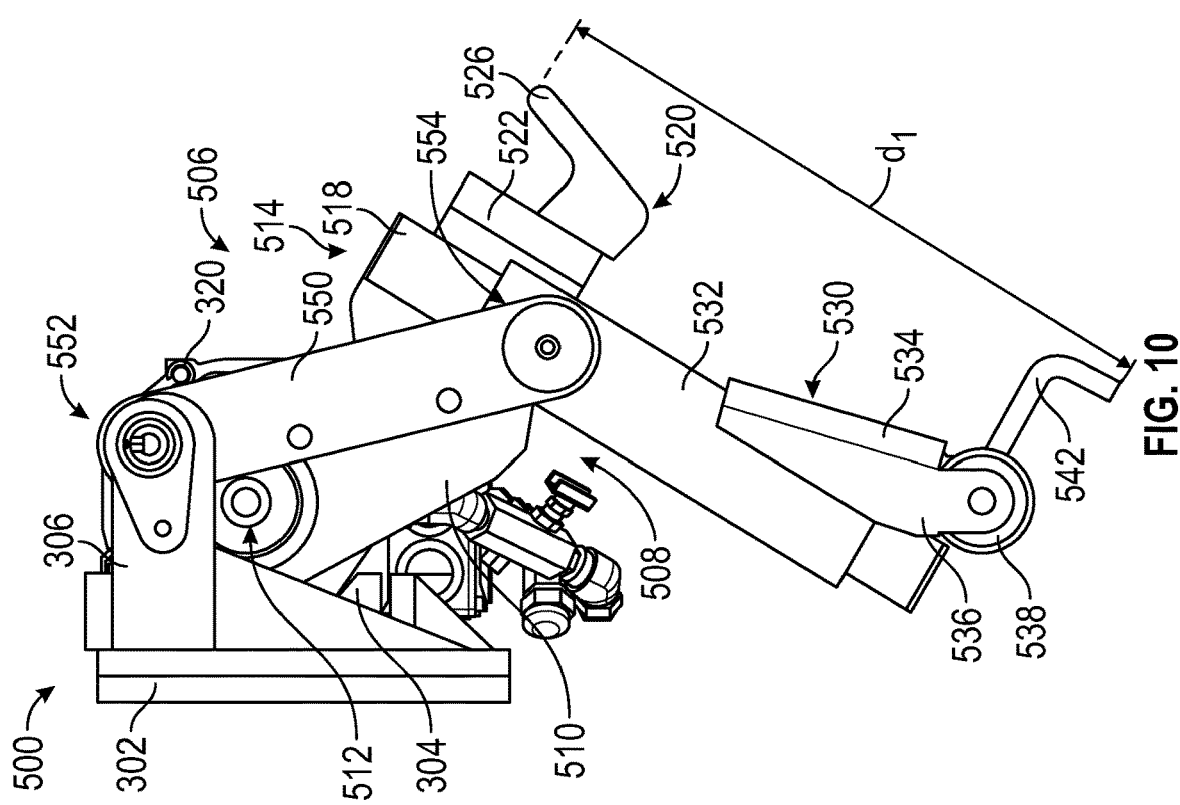
FIG. 10 is a side view of the lift assembly of FIG. 9 in a first orientation, according to an exemplary embodiment.

As shown in FIGS. 9-11, the rear-loading lift assembly is a third lift assembly (e.g., a tipper assembly, etc.), shown as lift assembly 500. The lift assembly 500 may be similar to the lift assembly 300 except as identified below. As shown in FIGS. 9-11, the lift assembly 500 includes an implement, shown as tipper implement 506, coupled to the base plate 302 and the pivot actuator 320. According to an exemplary embodiment, the tipper implement 506 is configured to selectively engage the refuse container 60. The pivot actuator 320 is then configured to pivot the tipper implement 506 and the refuse container 60 about an axis, shown pivot axis 502, to facilitate dumping the contents within the refuse container 60 (e.g., trash, recyclables, etc.) into the refuse compartment 30 through the hopper opening 35 in the tailgate 34 of the refuse vehicle 10.

As shown in FIGS. 9-11, the tipper implement 506 of the lift assembly 500 includes a first pair of arms, shown as pivot arms 508, pivotally coupled to the pivot actuator 320; a first engagement assembly, shown as upper engagement assembly 520, coupled to the pivot arms 508; a second engagement assembly, shown as lower engagement assembly 530, coupled to the pivot arms 508; and a second pair of arms, shown as support arms 550, extending between the base plate 302 and the lower engagement assembly 530.

As shown in FIG. 9-11, each of the pivot arms 508 include a plate, shown as arm plate 510, having (i) a first end, shown as base end 512, pivotally coupled to a respective end of the pivot actuator 320 and (ii) an opposing second end, shown as implement end 514, coupled the upper engagement assembly 520 and the lower engagement assembly 530. According to the exemplary embodiment shown in FIG. 9, the base ends 512 of the pivot arms 508 are directly coupled to opposing sides of the pivot actuator 320. As shown in FIG. 9, each of the pivot arms 508 includes an interface, shown as support plate 516, positioned between the base end 512 and the implement end 514 of each of the arm plates 510 and extending inward from an inner surface thereof. As shown in FIGS. 9-11, each of the pivot arms 508 includes an extension, shown as rod 518, extending downward from the implement end 514 of each of the arm plates 510.

As shown in FIGS. 9-11, the upper engagement assembly 520 includes a first bracket, shown as upper engagement bracket 522. As shown in FIG. 9, the upper engagement bracket 522 has (i) flanges, shown as coupling flanges 524, extending from opposing ends of the upper engagement bracket 522 that are configured to interface with the support plates 516 of the pivot arms 508 to couple the upper engagement bracket 522 to the pivot arms 508. As shown in FIGS. 9-11, the upper engagement assembly 520 includes a first retainer, shown as upper retainer 526, disposed along a front surface of the upper engagement bracket 522.

As shown in FIGS. 9-11, the lower engagement assembly 530 includes a pair of receivers, shown as cylinders 532, having upper ends that receive the rods 518 of the upper engagement assembly 520, and a second bracket, shown as lower engagement bracket 534, extending between lower ends of the cylinders 532. The lower engagement bracket 534 includes a plurality of interfaces, shown as roller interfaces 536, extending from a bottom edge thereof. The roller interfaces 536 facilitate rotationally coupling a plurality of rollers, shown as rollers 538, to the lower engagement bracket 534 proximate each lateral end of the lower engagement bracket 534 and spaced from each other such that a gap, shown as retainer gap 540, if formed therebetween. The lower engagement bracket 534 further includes a second retainer, shown as lower retainer 542, positioned within the retainer gap 540 and extending from the bottom edge of the lower engagement bracket 534.

As shown in FIGS. 9-11, each of the support arms 550 includes (i) a first end, shown as base end 552, pivotally coupled to a respective one of the supports 306 disposed along the base plate 302 and (ii) an opposing second end, shown as implement end 554, pivotally coupled to the upper end of a respective one of the cylinders 532 of the lower engagement assembly 530.

As shown in FIGS. 10 and 11, the pivot arms 508 are coupled to the pivot actuator 320 such that the engagement of the pivot actuator 320 facilitates selectively pivoting the pivot arms 508 about the pivot axis 502 and, thereby, the upper engagement assembly 520, the lower engagement assembly 530, and the support arms 550 therewith between the base position, as shown in FIG. 10, and the dump position, as shown in FIG. 11. According to the exemplary embodiment shown in FIGS. 10 and 11, the rods 518 of the upper engagement assembly 520 and the cylinders 532 of the lower engagement assembly 530 translate relative to each other (i.e., the rods 518 slide in and out of the cylinders 532) as the tipper implement 506 is pivoted between the base position and the dump position. Specifically, (i) as shown in FIG. 10, the upper retainer 526 of the upper engagement assembly 520 is spaced a first distance $d_1$ from the lower retainer 542 of the lower engagement assembly 530 when the tipper implement 506 is in the base position and (ii) as shown in FIG. 11, the upper retainer 526 of the upper engagement assembly 520 is spaced a second, longer distance $d_2$ from the lower retainer 542 of the lower engagement assembly 530 when the tipper implement 506 is in the dump position. According to an exemplary embodiment, only the upper retainer 526 is configured to engage a first, upper interface (e.g., a lip, etc.) of the refuse container 60 when the tipper implement 506 is in the base position. Then, as the tipper implement 506 is pivoted about the pivot axis 502 from the base position toward the dump position, the upper retainer 526 and the lower retainer 542 will begin to separating further apart from each other until the lower retainer 542 engages a second, lower interface (e.g., a bar, etc.) of the refuse container 60, thereby securing the refuse container 60 to the tipper implement 506.

Figure 12:
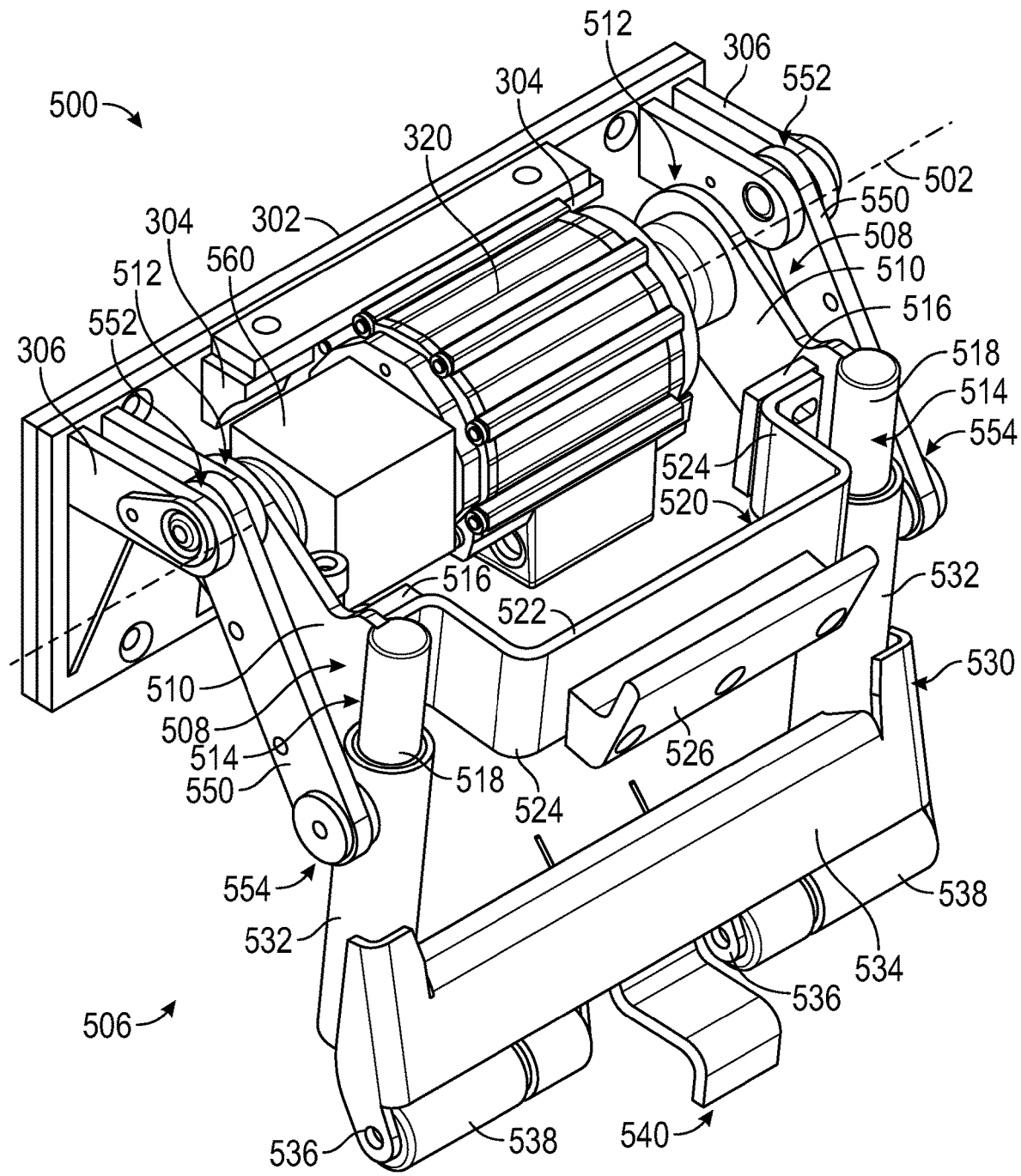
FIG. 12 is a front perspective view of the lift assembly of FIG. 9, according to another exemplary embodiment.

As shown in FIG. 12, the lift assembly 500 includes a first transmission device, shown as inline transmission device 560, positioned along the pivot axis 502 (e.g., an in-line arrangement, etc.) between the pivot actuator 320 and at least one of the pivot arms 508. The pivot actuator 320, thereby, indirectly drives the motion of the pivot arms 508 and the tipper implement 506 through the inline transmission device 560. In some embodiments, the inline transmission device 560 is or includes a planetary or an epicyclic gearbox. In some embodiments, the inline transmission device 560 is or includes a cycloidal drive. In some embodiments, the inline transmission device 560 is or includes a harmonic drive. It should be understood that the inline transmission device 560 could similarly be implemented with the lift assembly 300 and/or the lift assembly 400.

Figure 13:
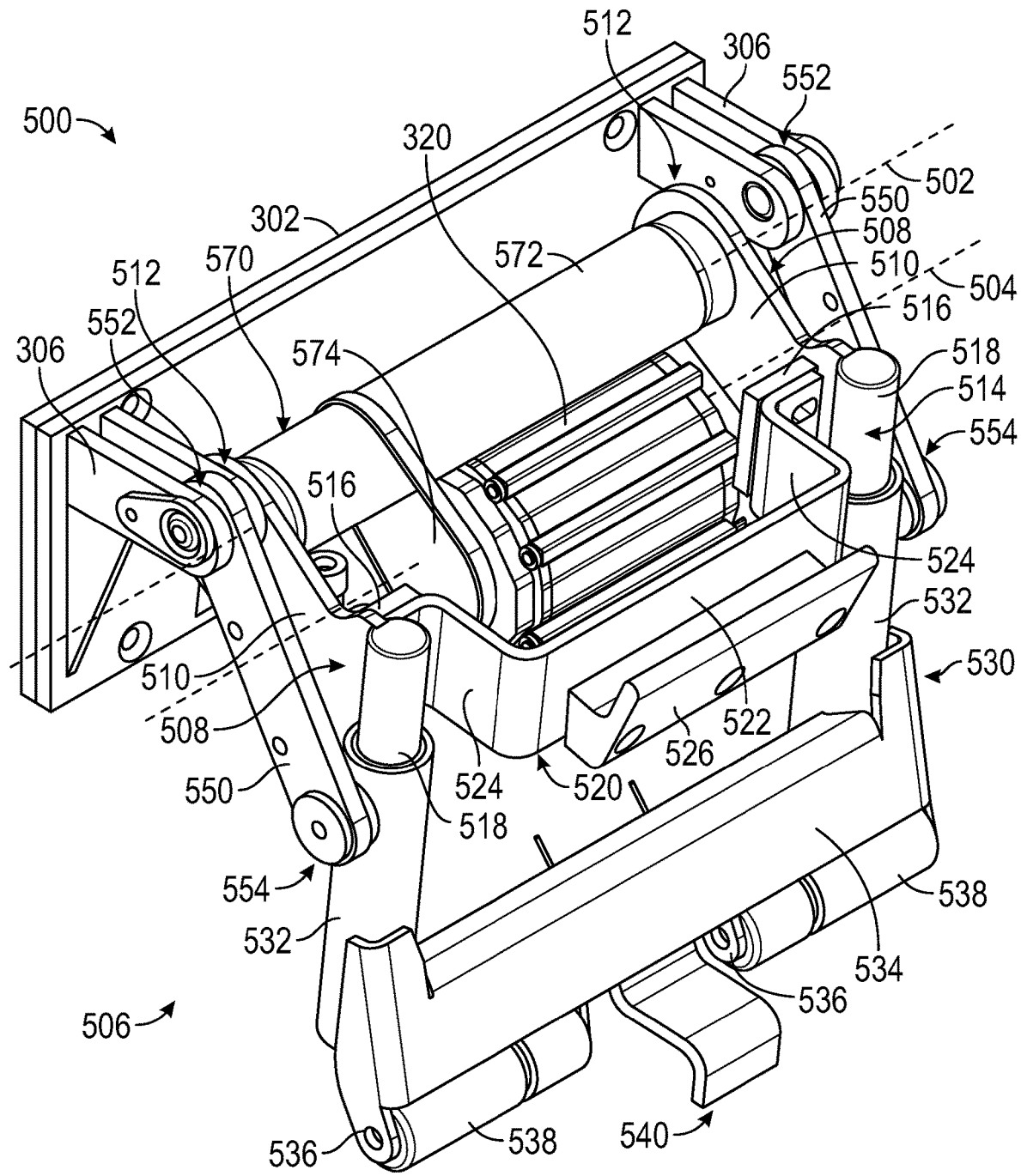
FIG. 13 is a front perspective view of the lift assembly of FIG. 9, according to still another exemplary embodiment.

As shown in FIG. 13, the lift assembly 500 includes a second transmission device, shown as offset transmission device 570, positioned between the pivot actuator 320 and at least one of the pivot arms 508. Specifically, the pivot actuator 320 is coupled to the base plate 302 and positioned offset from the pivot axis 502 along a second axis, shown as offset axis 504, that is parallel to the pivot axis 502 (e.g., a parallel arrangement, etc.). The pivot actuator 320, thereby, indirectly drives the motion of the motion of the pivot arms 508 and the tipper implement 506 through the offset transmission device 570. As shown in FIG. 13, the offset transmission device 570 includes (i) a shaft, shown as pivot shaft 572, extending along the pivot axis 502 and between the base ends 512 of the pivot arms 508 and (ii) an intermediary connector, shown as connector 574, rotationally coupling the pivot actuator 320 to the pivot shaft 572. In some embodiments, the offset transmission device 570 does not include the pivot shaft 572. Rather, the connector 574 may be directly coupled to the base end 512 of one of the pivot arms 508. Alternatively, the connector 574 may include (i) a first connector that extends between a first output of the pivot actuator 320 and a first pivot arm 508 and (ii) a second connector that extends between a second output of the pivot actuator 320 and a second pivot arm 508.

Figure 16:
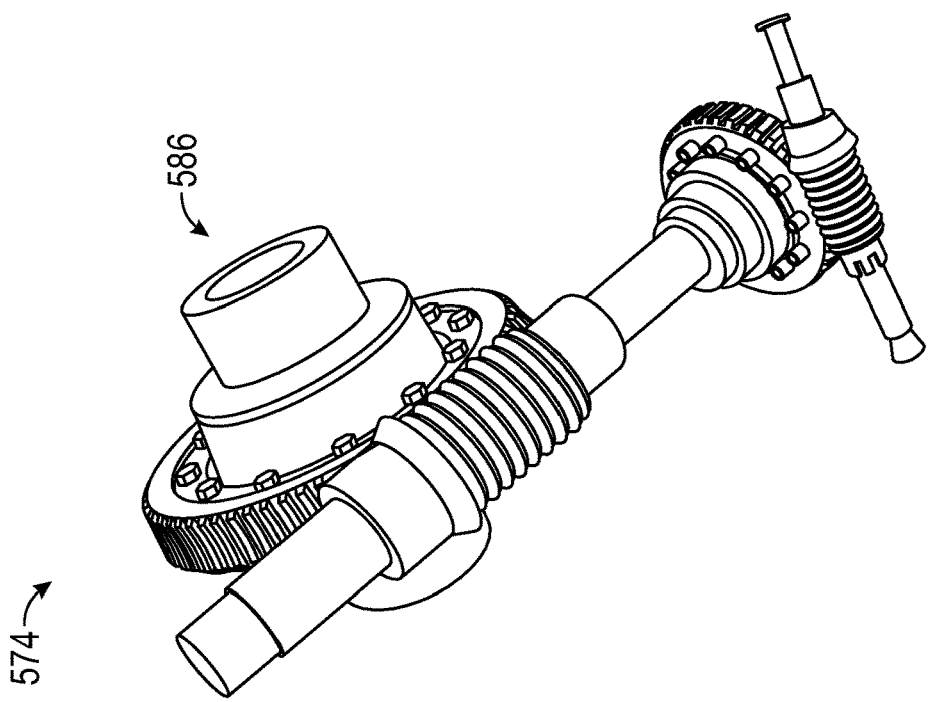
FIGS. 14-16 show various gearboxes useable with the lift assembly of FIG. 13, according to various exemplary embodiments.
Figure 15:
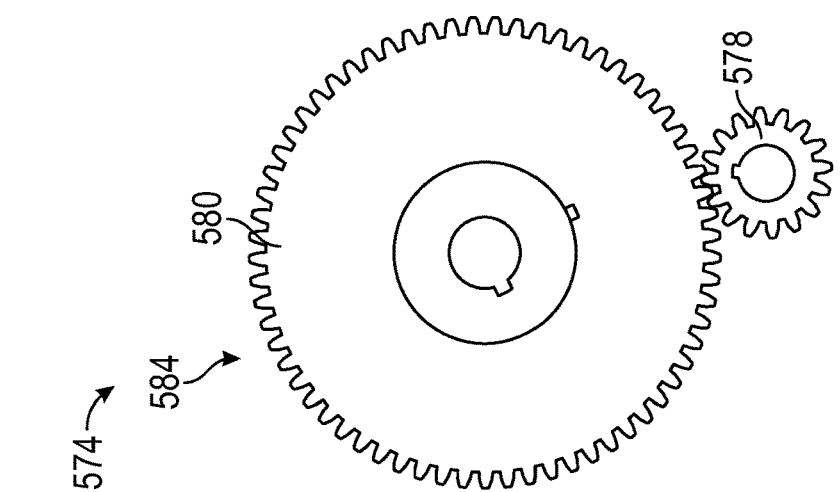
Figure 14:
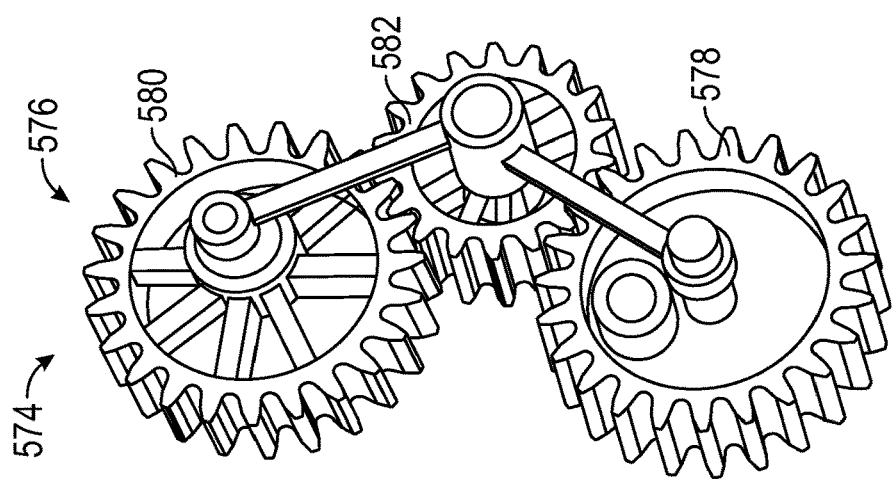

In some embodiments, the connector 574 is or includes a gearbox. In some embodiments, the connector 574 is or includes a belt or chain assembly. As shown in FIG. 14, the connector 574 includes an eccentric gearing gearbox 576 having (i) an input gear 578 configured to couple to an output of the pivot actuator 320, (ii) an output gear 580 configured to couple to the pivot shaft 572 (or directly to one of the pivot arms 508), and (iii) an intermediary gear 582 positioned between the input gear 578 and the output gear 580 and offset from the rotational axes thereof. As shown in FIG. 15, the connector 574 includes a parallel axis gearing gearbox 584 having (i) the input gear 578 and the output gear 580 directly coupled to the input gear 578. As shown in FIG. 16, the connector 574 includes a double-reduction worm gear gearbox 586. It should be understood that the offset transmission device 570 could similarly be implemented with the lift assembly 300 and/or the lift assembly 400.

Figure 17:
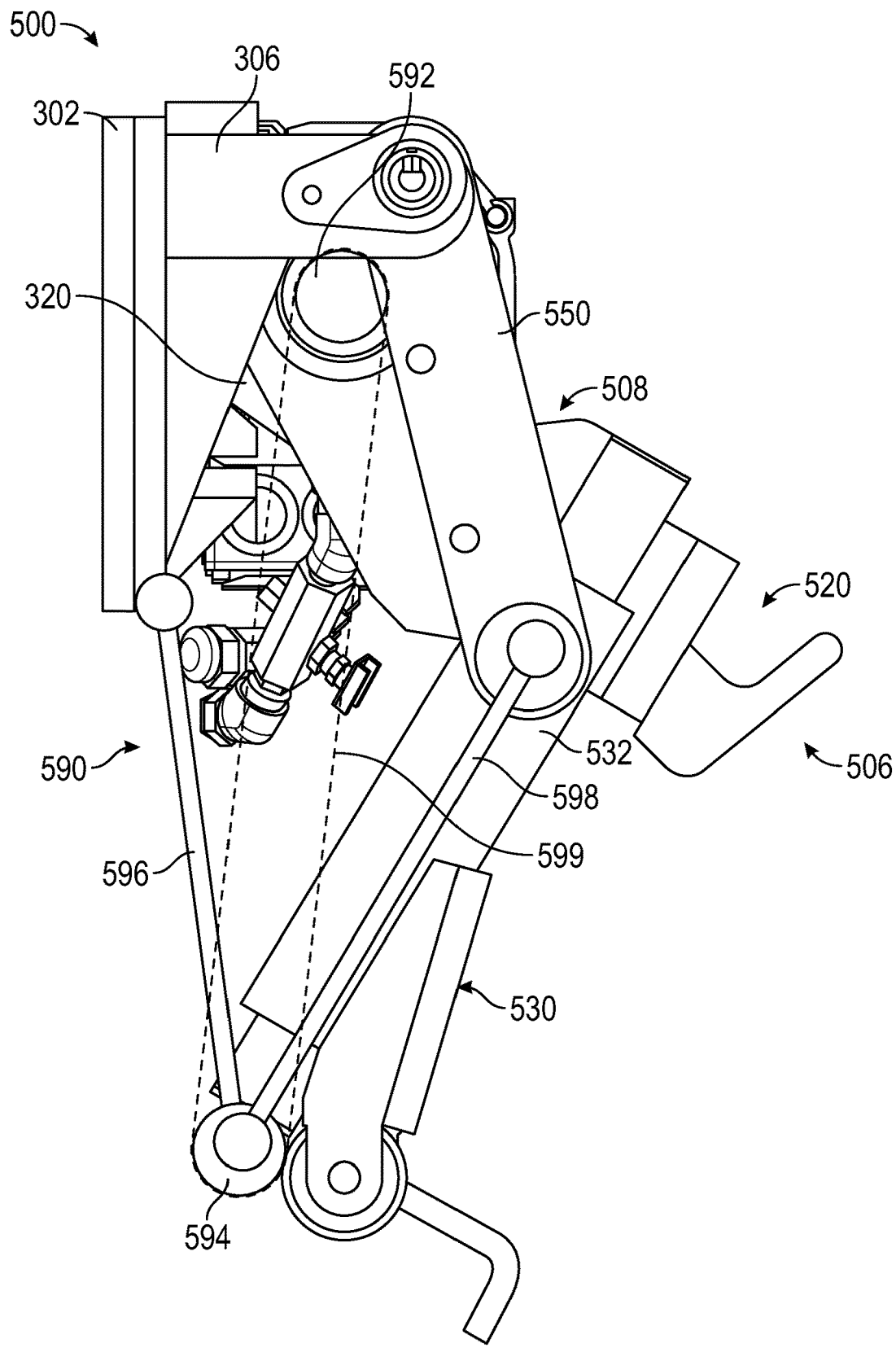
FIG. 17 is a side view of the lift assembly of FIG. 2 in a first orientation, according to yet another exemplary embodiment.
Figure 18:
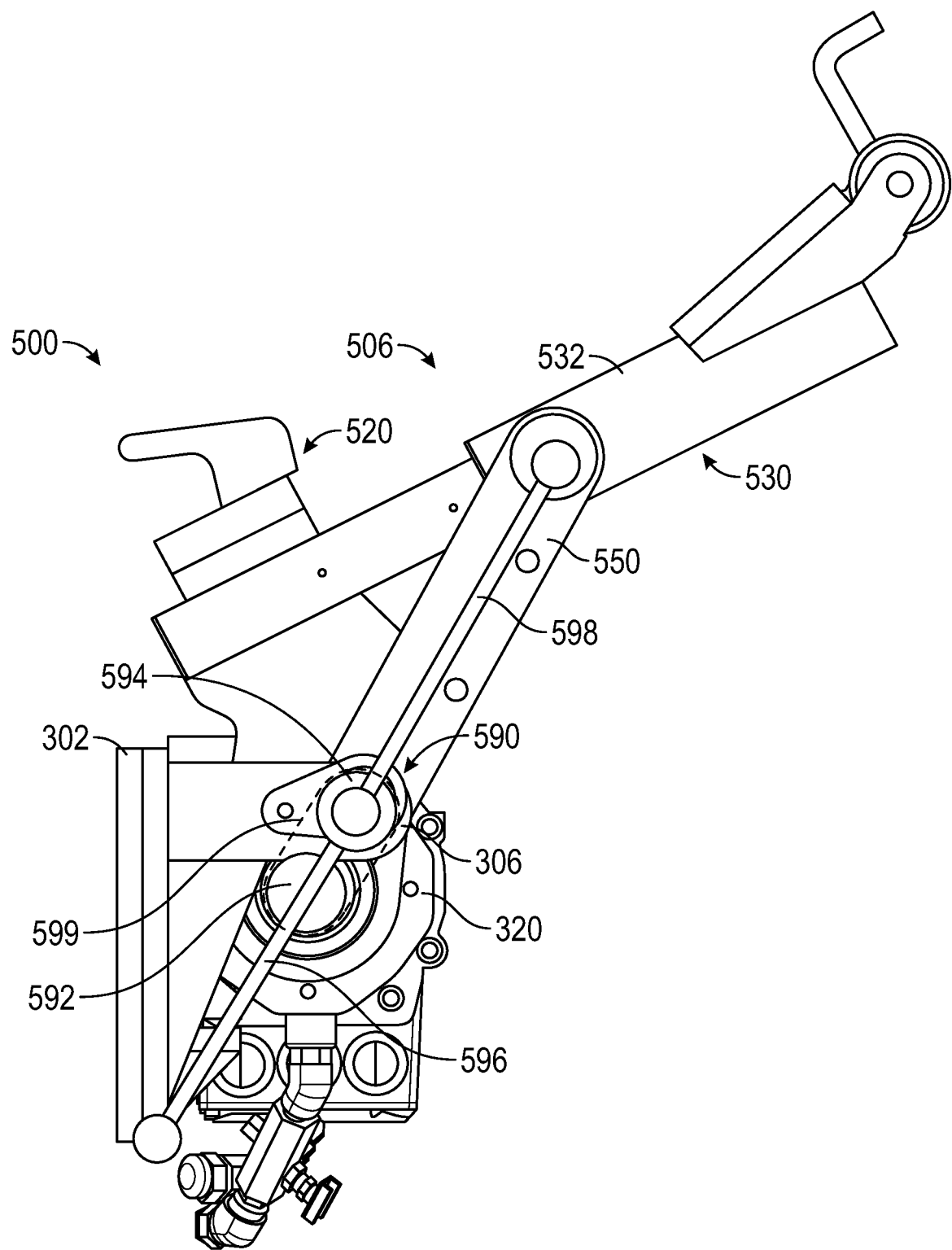
FIG. 18 is a side view of the lift assembly of FIG. 17 in a second orientation, according to an exemplary embodiment.

As shown in FIGS. 17 and 18, the lift assembly 500 includes a linkage system, shown as linkage assembly 590, having a first pulley, shown as motor pulley 592, fixed to the output of the pivot actuator 320; a second pulley, shown as traveling pulley 594; a first linkage, shown as link 596, extending between a pivot at the bottom of the base plate 302 and the traveling pulley 594; a second linkage, shown as link 598, extending between the traveling pulley 594 and the lower engagement assembly 530 (e.g., the interior side of a respective one of the cylinders 532, etc.); and a cable, shown as looped cable 599, extending around the motor pulley 592 and the traveling pulley 594. In some embodiments, the lift assembly 500 includes a pair of linkage assemblies 590, one on each side of the pivot actuator 320. In some embodiments, the pivot arms 508 are directly, pivotally coupled to the base plate 302, rather than the pivot actuator 320, when the lift assembly 500 includes the linkage assembly 590. According to the exemplary embodiment shown in FIGS. 17 and 18, the pivot actuator 320 drives the motor pulley 592, which winds the looped cable 599 around the motor pulley 592, thereby pulling on the traveling pulley 594, which causes the link 596 and the link 598 to pivot and drive the tipper implement 506 from the base position to the dump position. It should be understood that the linkage assembly 590 could similarly be implemented with the lift assembly 300 and/or the lift assembly 400.

Figure 19:
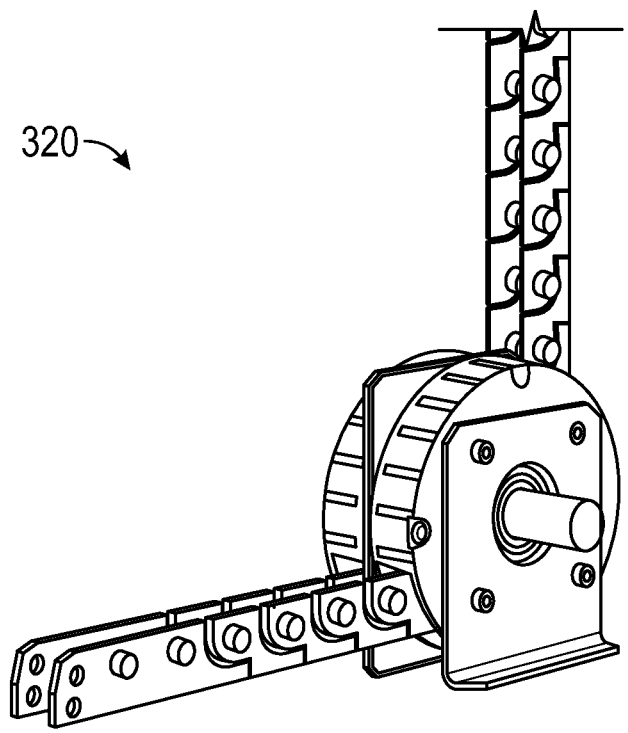
Figure 20:
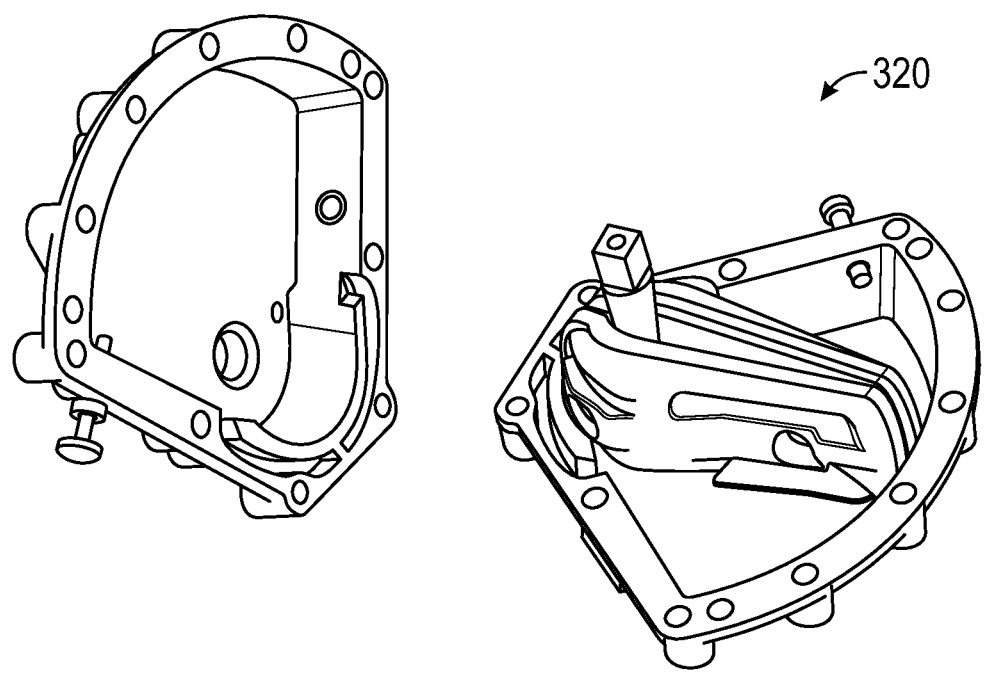

According to the various embodiments shown in FIGS. 19-22, various other types of actuators are usable with the lift assembly 300, the lift assembly 400, and/or the lift assembly 500 other than an electric motor directly or indirectly coupled to the tipper implement 506 of the lift assembly 500, the implement 410 of the lift assembly 400, and/or the engagement plate 310 of the lift assembly 300. As shown in FIG. 19, the pivot actuator 320 is configured as an electric motor acting through a push chain where the push chain is configured to engage with and pivot the tipper implement 506 of the lift assembly 500, the implement 410 of the lift assembly 400, and/or the engagement plate 310 of the lift assembly 300 between the base position and the dump position. As shown in FIG. 20, the pivot actuator 320 is configured as pneumatic rotary vane having an output shaft that is configured to pivot the tipper implement 506 of the lift assembly 500, the implement 410 of the lift assembly 400, and/or the engagement plate 310 of the lift assembly 300 between the base position and the dump position. In some embodiments, the pneumatic rotary vane is replaced with a hydraulic rotary actuator. The air and/or hydraulic fluid may be provided to the pneumatic rotary vane and/or the hydraulic rotary actuator by a fluid pump (e.g., a pneumatic pump, a hydraulic pump, etc.) driven by an electric motor. As shown in FIGS. 21 and 22, the pivot actuator 320 is a linear actuator configured to pivot the tipper implement 506 of the lift assembly 500, the implement 410 of the lift assembly 400, and/or the engagement plate 310 of the lift assembly 300 between the base position and the dump position. In some embodiments, the linear actuator is an electric linear actuator (e.g., a ball screw linear actuator driven by an electric motor, a ball screw linear actuator driven by an electric motor, a linear, mechanical actuator, etc.). In some embodiments, linear actuator is a fluidly operated actuator (e.g., a hydraulic cylinder, a pneumatic cylinder, etc.) operated by a fluid pump (e.g., a hydraulic pump, a pneumatic pump, etc.) driven by an electric motor (e.g., the electric motor 18, the secondary electric motor, an integrated motor of the fluid pump, etc.).

Figure 23:
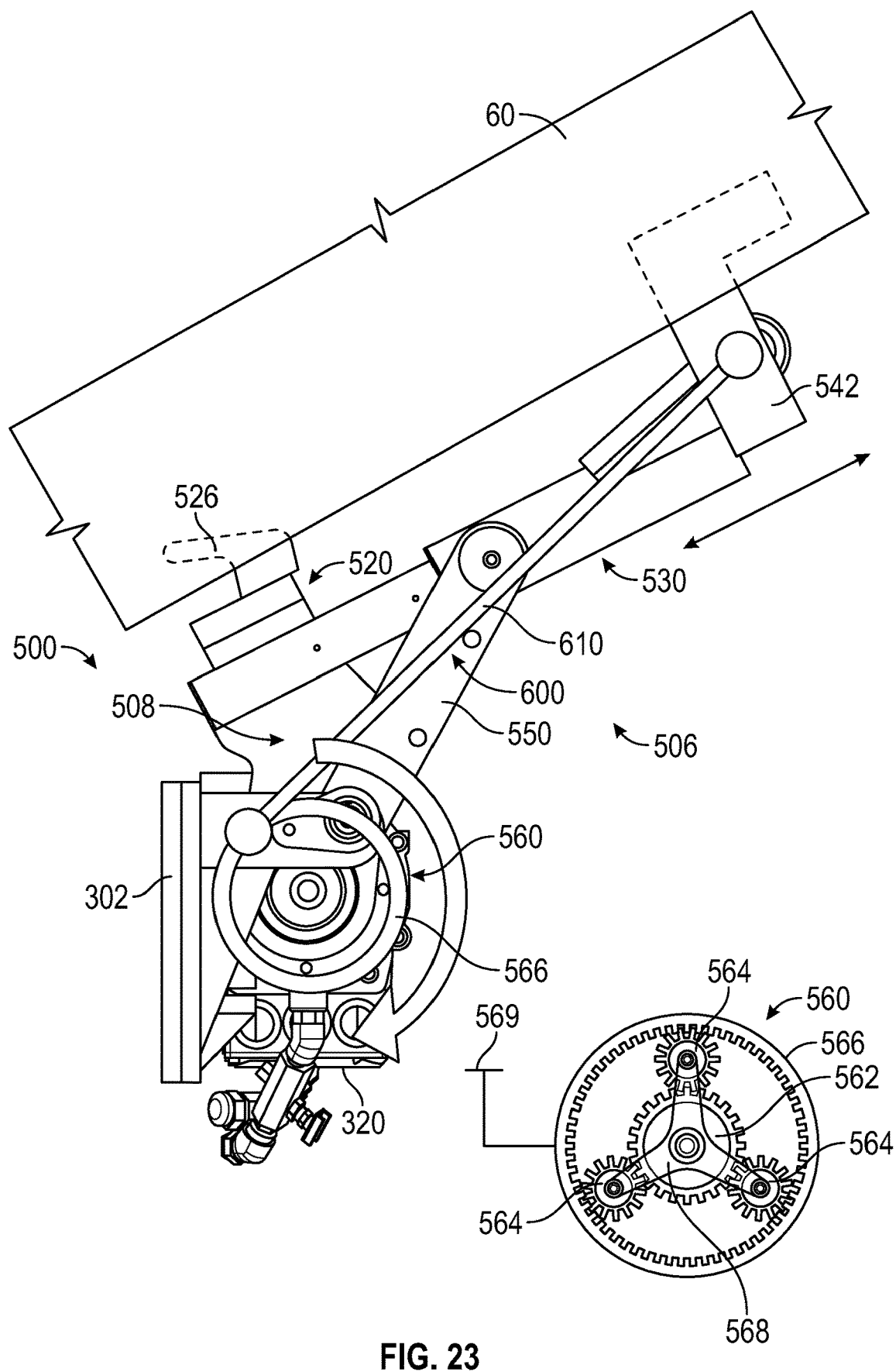
FIGS. 23-25 show various vibration/shake systems usable with the lift assembly of FIG. 2, according to various exemplary embodiments.
Figure 24:
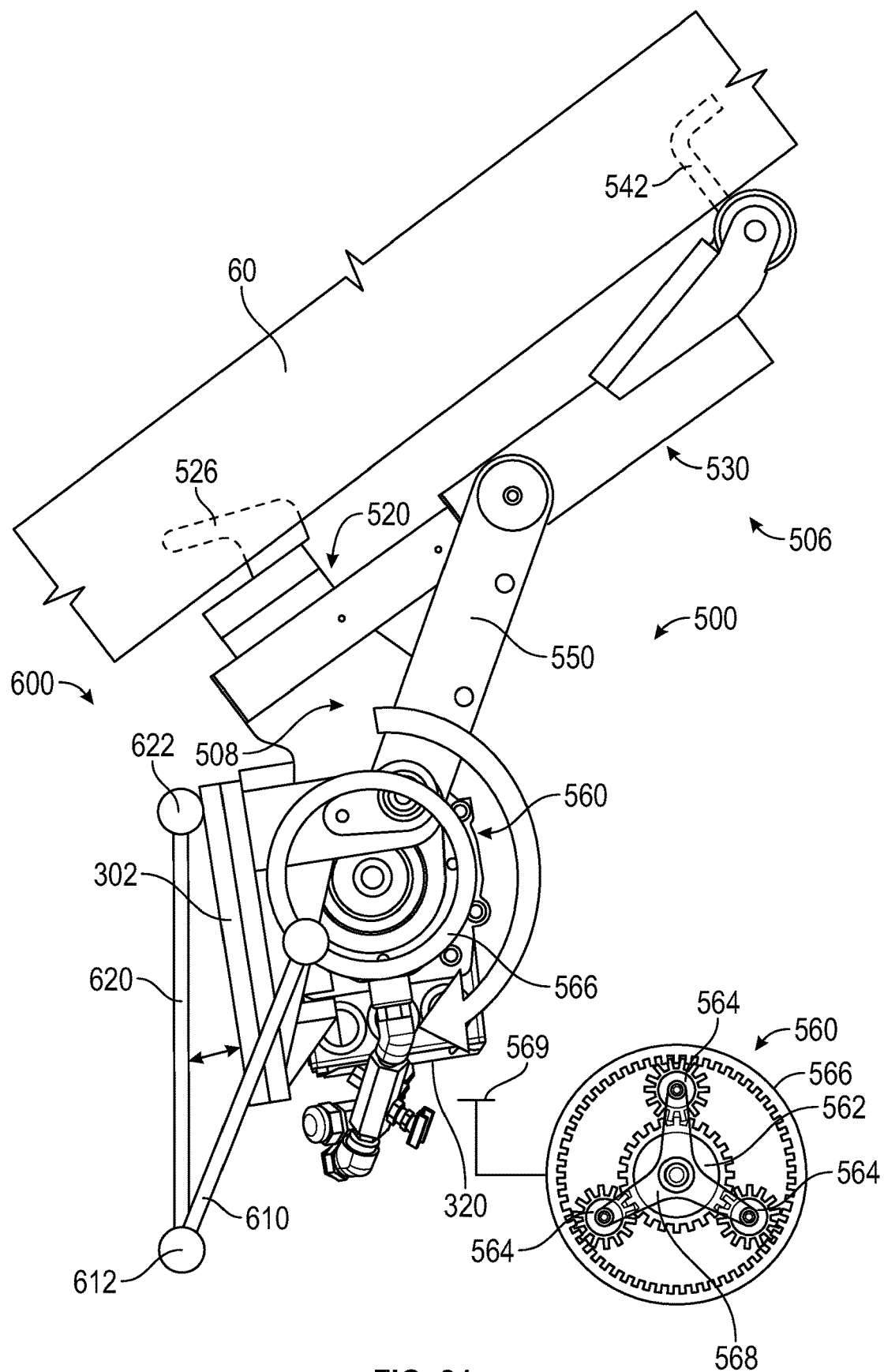
Figure 25:
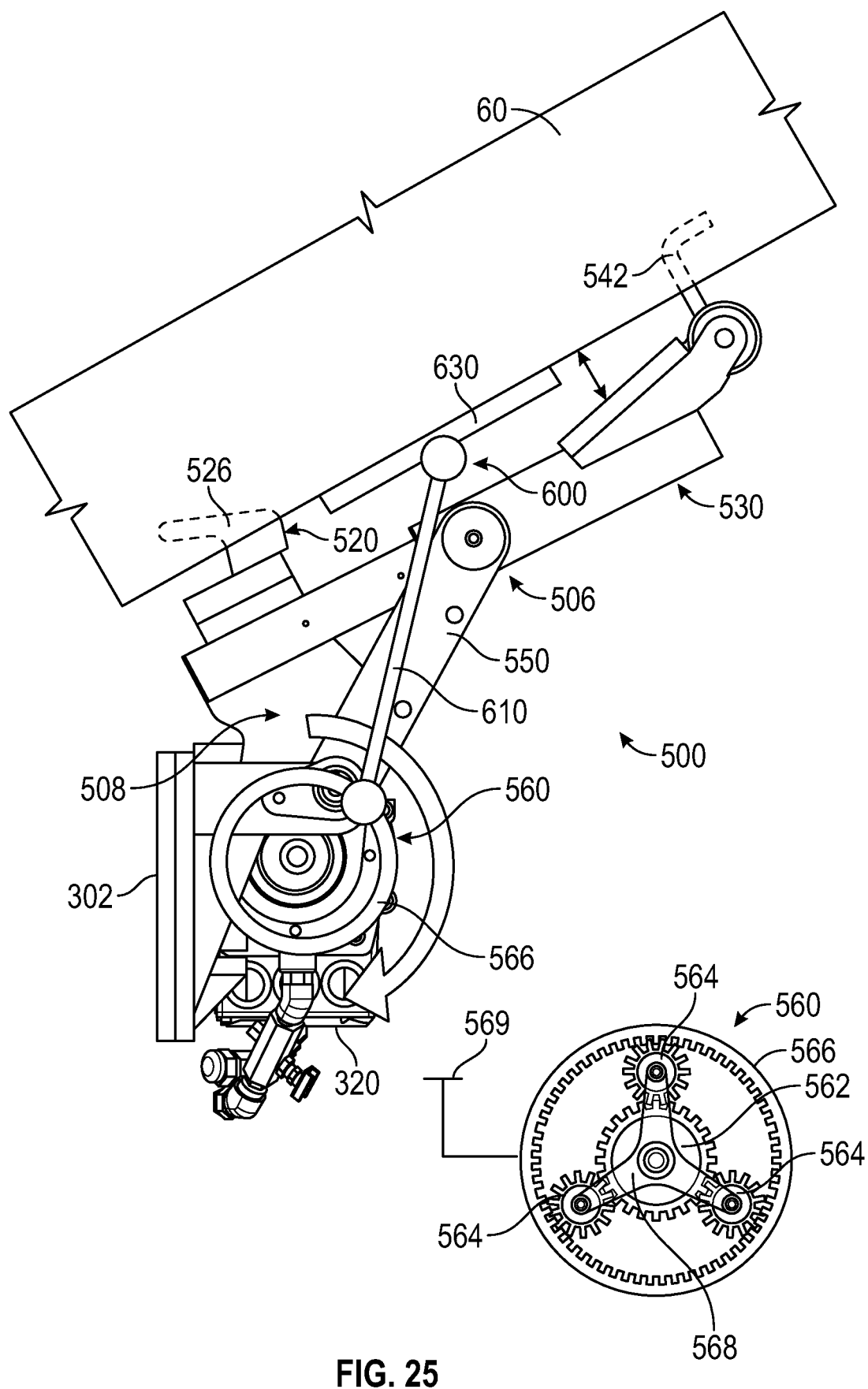

As shown in FIGS. 23-25, the lift assembly 500 includes a vibratory system, shown as shaker system 600. According to an exemplary embodiment, the shaker system 600 is configured to perform a shake function to vibrate, shake, or otherwise agitate the refuse container 60 when (i) the refuse container 60 is coupled to the tipper implement 506 and (ii) the tipper implement 506 is in the duping position to dislodge the contents within the refuse container 60 and coax them to fall out of the refuse container 60 into the hopper opening 35 in the tailgate 34 of the refuse vehicle 10. As shown in FIGS. 23-25, the shaker system 600 is used in combination with the pivot actuator 320 and the inline transmission device 560 to perform the shake function. Specifically, the inline transmission device 560 used with the shaker system 600 is a planetary or epicyclic gearbox having (i) a sun gear 562 coupled to the output of the pivot actuator 320, (ii) a plurality of planet gears 564 in meshing engagement with the sun gear 562, (iii) a ring gear 566 in meshing engagement with the plurality of planet gears 564, (iv) a carrier 568 coupled to (a) the plurality of planet gears 564 and (b) one of the pivot arms 508, and (v) a brake 569 positioned to selectively engage and prevent rotation of the ring gear 566.

As shown in FIG. 23, the shaker system 600 includes a first linkage or cam, shown as linkage 610, extending between the ring gear 566 and the lower retainer 542. In such an embodiment, the lower retainer 542 is configured to oscillate up and down within the retainer gap 540 to provide the shake function. Specifically, the shake function may be performed as follows: (i) the brake 569 is engaged to limit rotation of the ring gear 566; (ii) the pivot actuator 320 provides an input to the sun gear 562, which causes (a) the plurality of planet gears 564 to rotate about the sun gear 562 and relative to the ring gear 566 and (b) the carrier 568 to rotate with the plurality of planet gears 564; (iii) the rotation of the carrier 568 pivots the pivot arms 508 and, thereby, the tipper implement 506 about the pivot axis 502 from the base position to the dump position; (iv) when the dump position is reached, the tipper implement 506 experiences a hard stop that stops rotation of the carrier 568 and causes a torque spike; (v) the torque spike either (a) causes the braking force of the brake 569 on the ring gear 566 to be overcome such that the ring gear 566 begins to rotate or (b) causes the brake 569 to disengage such that the ring gear 566 begins to rotate; and (vi) the rotation of the ring gear 566 drives the linkage 610 therewith, which causes the lower retainer 542 to oscillate up and down, providing the shake function to the refuse container 60.

As shown in FIG. 24, the shaker system 600 includes the linkage 610 extending from the ring gear 566 and a second linkage, shown as linkage 620, having a first end pivotally coupled to an end of the linkage 610 opposite the ring gear 566 at a pivot 612 and an opposing second end pivotally coupled to a pivot 622 of the tailgate 34. The upper end of the base plate 302 may also be pivotally coupled to the pivot 622. In such an embodiment, the entire lift assembly 500 is configured to oscillate to provide the shake function. Specifically, the shake function may be performed as follows: (i) the brake 569 is engaged to limit rotation of the ring gear 566; (ii) the pivot actuator 320 provides an input to the sun gear 562, which causes (a) the plurality of planet gears 564 to rotate about the sun gear 562 and relative to the ring gear 566 and (b) the carrier 568 to rotate with the plurality of planet gears 564; (iii) the rotation of the carrier 568 pivots the pivot arms 508 and, thereby, the tipper implement 506 about the pivot axis 502 from the base position to the dump position; (iv) when the dump position is reached, the tipper implement 506 experiences a hard stop that stops rotation of the carrier 568 and causes a torque spike; (v) the torque spike either (a) causes the braking force of the brake 569 on the ring gear 566 to be overcome such that the ring gear 566 begins to rotate or (b) causes the brake 569 to disengage such that the ring gear 566 begins to rotate; and (vi) the rotation of the ring gear 566 drives the linkage 610 and the linkage 620 therewith, which causes the base plate 302 to pivotally oscillate about the pivot 622, providing the shake function to the refuse container 60.

As shown in FIG. 25, the shaker system 600 includes the linkage 610 extending from the ring gear 566 and plate, shown as shaker plate 630, (i) positioned between the upper retainer 526 and the lower retainer 542 to engage the refuse container 60 and (ii) coupled to an end of the linkage 610 opposite the ring gear 566. In such an embodiment, the shaker plate 630 is configured to oscillate to provide the shake function. Specifically, the shake function may be performed as follows: (i) the brake 569 is engaged to limit rotation of the ring gear 566; (ii) the pivot actuator 320 provides an input to the sun gear 562, which causes (a) the plurality of planet gears 564 to rotate about the sun gear 562 and relative to the ring gear 566 and (b) the carrier 568 to rotate with the plurality of planet gears 564; (iii) the rotation of the carrier 568 pivots the pivot arms 508 and, thereby, the tipper implement 506 about the pivot axis 502 from the base position to the dump position; (iv) when the dump position is reached, the tipper implement 506 experiences a hard stop that stops rotation of the carrier 568 and causes a torque spike; (v) the torque spike either (a) causes the braking force of the brake 569 on the ring gear 566 to be overcome such that the ring gear 566 begins to rotate or (b) causes the brake 569 to disengage such that the ring gear 566 begins to rotate; and (vi) the rotation of the ring gear 566 drives the linkage 610 therewith, which causes the shaker plate 630 to oscillate, providing the shake function to the refuse container 60.

In other embodiments (e.g., embodiments where the lift assembly 500 does not include the inline transmission device 560, etc.), the shaker system 600 includes a shake actuator (e.g., an electric motor, etc.) independent of the pivot actuator 320 that performs the shake operation (e.g., by being coupled to and driving the linkage 610, the lower retainer 542, the linkage 620, the shaker plate 630, etc.). In still other embodiments (e.g., embodiments where the lift assembly 500 does not include the inline transmission device 560, embodiments where the shaker system 600 does not include the shaker actuator, etc.), the pivot actuator 320 is configured to perform the shake function by operating at the natural frequency thereof, which causes the lift assembly 500 to shake. Further, it should be understood that the shaker system 600 could similarly be implemented with the lift assembly 300 and/or the lift assembly 400.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the refuse vehicle 10 and the systems and components thereof as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. A tipper assembly for a refuse vehicle, the tipper assembly comprising:
   a base configured to couple to a tailgate of the refuse vehicle;
   an actuator powered by electric energy;
   an arm extending from and pivotally coupled to at least one of the actuator or the base;

an inline transmission positioned between the arm and the actuator along a pivot axis of the arm, the inline transmission including a planetary gear set; and an implement coupled to the arm;

wherein the implement is configured to engage with a refuse container such that operation of the actuator facilitates pivoting the implement and the refuse container from a base position to a dump position to dump contents within the refuse container into an opening in the tailgate; and wherein the planetary gear set is configured to provide a shake function in response to the dump position being reached to assist in the dumping of the contents within the refuse container.

2. The tipper assembly of claim 1, wherein the arm extends from and is pivotally coupled to the actuator.

3. The tipper assembly of claim 1, wherein the arm is a first arm, further comprising a second arm pivotally coupled to and extending between the base and the implement, and wherein a length of the second arm is selectively adjustable to modify an angle of the implement relative to the base.

4. The tipper assembly of claim 1, wherein the arm and the implement are integrally formed in a unitary structure.

5. The tipper assembly of claim 1, wherein the actuator includes a fluidly operated actuator, a fluid pump, and a motor, wherein the fluidly operated actuator is operated by the fluid pump, wherein the fluid pump is driven by the motor, and wherein the motor is powered by the electric energy.

6. The tipper assembly of claim 1, wherein the actuator is an electric motor.

7. The tipper assembly of claim 1, wherein the planetary gear set includes a sun gear coupled to an output of the actuator, a plurality of planet gears is meshing engagement with the sun gear, a carrier coupled to the plurality of planet gears and the arm, and a ring gear in meshing engagement with the plurality of planet gears, and wherein the ring gear is configured to provide the shake function in response to the dump position being reached.

8. The tipper assembly of claim 7, wherein the implement includes an upper retainer and a lower retainer that are configured to engage with the refuse container, further comprising a linkage extending between the ring gear and the lower retainer, and wherein the ring gear is configured to drive the linkage when the implement is in the dump position to oscillate the lower retainer to provide the shake function to assist in the dumping of the contents within the refuse container.

9. The tipper assembly of claim 7, further comprising:
a first linkage configured to pivotally couple to the tailgate; and
a second linkage extending between the ring gear and the first linkage;
wherein the ring gear is configured to drive the second linkage when the implement is in the dump position to pivot the first linkage and, thereby, the tipper assembly relative to the tailgate to provide the shake function to assist in the dumping of the contents within the refuse container.

10. The tipper assembly of claim 7, further comprising:
a shaker plate positioned to engage the refuse container; and
a linkage extending between the ring gear and the shaker plate;
wherein the ring gear is configured to drive the linkage when the implement is in the dump position to oscillate the shaker plate to provide the shake function to assist in the dumping of the contents within the refuse container.

11. The tipper assembly of claim 1, wherein the arm includes a first end and an opposing second end, wherein the implement includes an upper engagement assembly and a lower engagement assembly, wherein the first end is pivotally coupled to the at least one of the actuator or the base, and wherein the upper engagement assembly and the lower engagement assembly are coupled to the opposing second end of the arm.

12. The tipper assembly of claim 11, wherein the arm includes an interface disposed along a face thereof and an extension extending downward from the opposing second end of the arm, wherein the upper engagement assembly includes an upper bracket coupled to the interface of the arm and an upper retainer coupled to the upper bracket, and wherein the lower engagement assembly includes a receiver that slidably receives the extension of the arm, a lower bracket coupled to the receiver, and a lower retainer coupled to the lower bracket.

13. The tipper assembly of claim 12, wherein the arm is a first arm, further comprising a second arm pivotally coupled to and extending between the base and the receiver.

14. The tipper assembly of claim 13, wherein the extension and the receiver translate relative to each other as the implement is pivoted between the base position and the dump position such that a distance between the upper retainer and the lower retainer varies.

15. A tipper assembly for a refuse vehicle, the tipper assembly comprising:
a base configured to couple to a tailgate of the refuse vehicle;
an actuator powered by electric energy;
an arm extending from and pivotally coupled to at least one of the actuator or the base;
an implement coupled to the arm, wherein the implement is configured to engage with a refuse container such that operation of the actuator facilitates pivoting the arm, the implement, and the refuse container from a base position to a dump position to dump contents within the refuse container into an opening in the tailgate; and
a linkage assembly including:
a first pulley coupled to an output of the actuator;
a second pulley;
a first link pivotally coupled to and extending between the base and the second pulley;
a second link pivotally coupled to the second pulley and the implement; and
a cable extending between the first pulley and the second pulley;
wherein the actuator is configured to drive the first pulley, which winds the cable around the first pulley, thereby reducing a length of the cable and causing the cable to pull the second pulley closer to the first pulley, which causes the first link and the second link to pivot and drive the arm and the implement from the base position to the dump position.

16. A tipper assembly for a refuse vehicle, the tipper assembly comprising:
a base configured to couple to a tailgate of the refuse vehicle;
a pivot actuator coupled to the base;
a transmission coupled to the pivot actuator, wherein the transmission has a cycloidal drive or a planetary gearbox;

a first pair of arms, each arm of the first pair of arms including:
  a first end pivotally coupled to the pivot actuator by the transmission;
  an opposing second end having a rod extending therefrom; and
  an interface extending inward from an inner face thereof;
a first engagement assembly including:
  a first bracket coupled to the interface of each arm of the first pair of arms; and
  a first retainer disposed along the first bracket;
a second engagement assembly including:
  a pair of cylinders, each cylinder of the pair of cylinders receives the rod of a respective one of the first pair of arms;
  a second bracket extending between the pair of cylinders; and
  a second retainer disposed along the second bracket; and
a second pair of arms, each arm of the second pair of arms pivotally coupled to and extending between the base and a respective cylinder of the pair of cylinders;
wherein the rods and the cylinders translate relative to each other as the first pair of arms are pivoted by the pivot actuator such that a distance between the first retainer and the second retainer varies.

17. A tipper assembly for a refuse vehicle, the tipper assembly comprising:
  a base configured to couple to a tailgate of the refuse vehicle;
  a pivot actuator coupled to the base;
  a first arm positioned proximate a first end of the pivot actuator;
  a second arm positioned proximate an opposing second end of the pivot actuator;
  an implement coupled to the first arm and the second arm;
  a transmission connecting the pivot actuator to at least one of the first arm or the second arm, the transmission including:
    a sun gear driven by the pivot actuator;
    a plurality of planet gears is meshing engagement with the sun gear;
    a carrier coupled to the plurality of planet gears and the at least one of the first arm or the second arm; and
    a ring gear in meshing engagement with the plurality of planet gears; and
  a linkage coupled to the ring gear;
  wherein the carrier facilitates pivoting the implement from a base position to a dump position; and
  wherein the ring gear facilitates driving the linkage when the dump position is reached to provide a shake function when the implement is at the dump position.

* * * * *